(12) United States Patent
Tasaki et al.

(10) Patent No.: US 9,361,859 B2
(45) Date of Patent: Jun. 7, 2016

(54) INFORMATION PROCESSING DEVICE, METHOD, AND COMPUTER PROGRAM PRODUCT

(71) Applicant: Kabushiki Kaisha Toshiba, Minato-ku, Tokyo (JP)

(72) Inventors: Tsuyoshi Tasaki, Yokohama (JP); Yasunobu Yamauchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 2 days.

(21) Appl. No.: 14/463,510

(22) Filed: Aug. 19, 2014

(65) Prior Publication Data
US 2015/0062036 A1 Mar. 5, 2015

(30) Foreign Application Priority Data
Sep. 2, 2013 (JP) ................... 2013-181534

(51) Int. Cl.
| | |
|---|---|
| G06F 3/041 | (2006.01) |
| G09G 5/30 | (2006.01) |
| G09G 5/37 | (2006.01) |
| G06F 3/0488 | (2013.01) |
| G06F 17/30 | (2006.01) |
| H04N 5/44 | (2011.01) |
| H04N 21/422 | (2011.01) |

(52) U.S. Cl.
CPC ............ G09G 5/30 (2013.01); G06F 3/0488 (2013.01); G06F 3/04883 (2013.01); G06F 3/04886 (2013.01); G06F 17/30 (2013.01); G09G 5/37 (2013.01); H04N 5/4403 (2013.01); G09G 2354/00 (2013.01); H04N 21/42224 (2013.01); H04N 2005/443 (2013.01)

(58) Field of Classification Search
CPC ............ G06F 3/04883; G06F 3/167; G06F 17/30026; G06F 17/3005; G06F 3/0416; G06F 3/0488; G06F 2203/0381; G06F 3/16

USPC .................................. 345/173–179
See application file for complete search history.

(56) References Cited

U.S. PATENT DOCUMENTS

| | | | |
|---|---|---|---|
| 5,546,565 A | 8/1996 | Suzuki | |
| 2006/0290656 A1* | 12/2006 | Soong ................... | G06F 3/0237 345/156 |
| 2008/0115080 A1 | 5/2008 | Matulic | |
| 2009/0184935 A1* | 7/2009 | Kim ...................... | G06F 3/0488 345/173 |
| 2010/0262591 A1* | 10/2010 | Lee ...................... | G06F 3/04883 707/706 |
| 2012/0032979 A1* | 2/2012 | Blow .................... | G06F 1/1626 345/647 |
| 2012/0139859 A1* | 6/2012 | Ohira ..................... | G06F 3/018 345/173 |
| 2012/0154295 A1 | 6/2012 | Hinckley et al. | |
| 2012/0302167 A1* | 11/2012 | Yun ..................... | G06F 3/04883 455/41.2 |

(Continued)

FOREIGN PATENT DOCUMENTS

| | | |
|---|---|---|
| JP | 07-013687 | 1/1995 |
| JP | 2000-222522 | 8/2000 |

(Continued)

*Primary Examiner* — Hong Zhou
(74) *Attorney, Agent, or Firm* — Knobbe, Martens, Olson & Bear, LLP

(57) ABSTRACT

According to an embodiment, an information processing device includes a detector, a setting controller, and a controller. The detector detects a holding position of the information processing device. The setting controller sets a control region at a position separated by a distance from the detected holding position. The controller controls, based on whether the control region is touched, control a function.

13 Claims, 16 Drawing Sheets

(56) References Cited

U.S. PATENT DOCUMENTS

| | | | | |
|---|---|---|---|---|
| 2013/0069886 A1* | 3/2013 | Wang | ................ | G06F 3/044 345/173 |
| 2014/0035845 A1* | 2/2014 | Kameyama | ............. | G06F 3/041 345/173 |
| 2014/0164974 A1* | 6/2014 | Kim | ................... | G06F 3/04883 715/773 |
| 2014/0198057 A1* | 7/2014 | Xia | ................... | G06F 3/04883 345/173 |

FOREIGN PATENT DOCUMENTS

| | | |
|---|---|---|
| JP | 2008-140377 | 6/2008 |
| JP | 2010-128666 | 6/2010 |
| JP | 2013-008326 | 1/2013 |

\* cited by examiner

INFORMATION PROCESSING DEVICE, METHOD, AND COMPUTER PROGRAM PRODUCT

CROSS-REFERENCE TO RELATED APPLICATION(S)

This application is based upon and claims the benefit of priority from Japanese Patent Application No. 2013-181534, filed on Sep. 2, 2013; the entire contents of which are incorporated herein by reference.

FIELD

Embodiments described herein relate generally to an information processing device, a method, and a computer program product.

BACKGROUND

In an information processing device equipped with a touch input function, it is common practice in which a button is displayed on a touch-sensitive panel and implementation of a predetermined function is controlled in response to the operations of the button. For example, in a note application in which a handwriting input interface is used, a button is displayed on the touch-sensitive panel for the purpose of allowing changes in the display color or the line type of the handwritten characters. Thus, while the button is in an operated state, the display color or the line type of the handwritten characters is changed.

However, usually, such a button is displayed at a predetermined position on the touch-sensitive panel. For that reason, if a user is looking at a different area of the touch-sensitive panel to perform some sort of task and attempts to operate the button while performing the task, he or she needs to stop performing the task in progress and needs to visually confirm the position of the button before operating it. As a result, there occurs a decline in the work efficiency.

Besides, there are cases in which implementation of a predetermined function is controlled by a combination of multi-touch operations instead of button operations. However, in such cases too, it is necessary to stop performing the task in progress before performing a predetermined multi-touch operation. As a result, there occurs a decline in the work efficiency.

For that reason, there has been a demand for an information processing device that enables controlling implementation of a predetermined function in response to a simpler operation.

DETAILED DESCRIPTION

According to an embodiment, an information processing device includes a detector, a setting controller, and a controller. The detector detects a holding position of the information processing device. The setting controller sets a control region at a position separated by a distance from the detected holding position. The controller controls, based on whether the control region is touched, control a function.

An information processing device according to an embodiment sets a control region at a position that is separated by a predetermined distance from the position of a finger of the user who is holding that information processing device. Then, based on whether the finger of the user is touching the control region, the information processing device controls a function. Herein, the control region is not set in a fixed manner at a predetermined position, but is set in a variable manner according to a holding position of the information processing device that indicates the position of a finger of the user who is holding the information processing device. That is, if there is a change in the holding position, then the position of the control region also changes accordingly, and the new control region is set at a position that is separated by a predetermined distance from the new holding position. Herein, the predetermined distance is determined based on, for example, the range of movement of fingers in the case in which an average user holds the information processing device and moves only one finger (mainly the thumb) toward the center of the information processing device.

In the information processing device according to the embodiment, the present control region is set at a position that is separated by a predetermined distance from the present holding position. Hence, without having to visually confirm the position of the control region, the user becomes able to touch the control region with a simple operation of moving only a finger while holding the information processing device. As a result, in the information processing device according to the embodiment, it becomes possible to control implementation of a predetermined function without forcing the user to stop performing the task in progress.

Figure 1A:
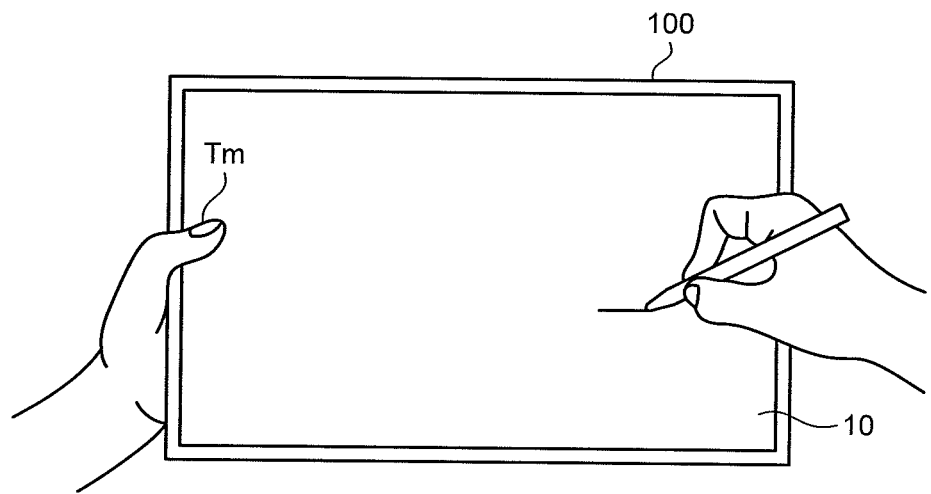
FIGS. 1A and 1B are diagrams illustrating examples of usage conditions of an information processing device according to an embodiment.
Figure 1B:
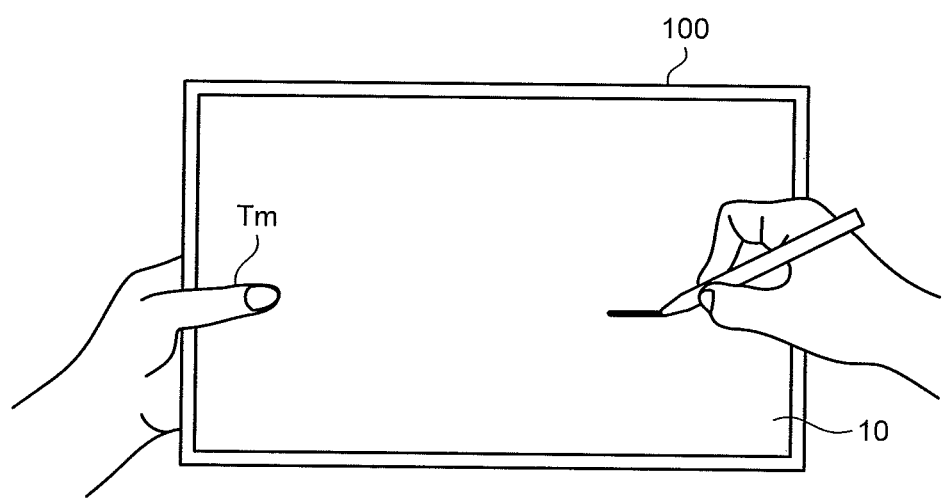

FIGS. 1A and 1B are diagrams illustrating examples of usage conditions of the information processing device according to the embodiment. An information processing device 100 illustrated in FIGS. 1A and 1B includes a touch-sensitive panel 10. As illustrated in FIG. 1A, for example, when a user holds the information processing device 100 in the left hand, the position of a thumb Tm of the left hand of the user is detected as the holding position. Then, the control region is set at a position that is separated by a predetermined distance from the holding position toward the center point of the information processing device 100 (i.e., toward the center point of the touch-sensitive panel 10). Then, as illustrated in FIG. 1B, when the user moves the thumb Tm in a sliding manner on the screen toward the center of the touch-sensitive panel 10, the thumb Tm makes contact with the control region.

Based on whether the thumb Tm of the user is in contact with the control region, the information processing device 100 controls a predetermined function. For example, consider a case in which a note application is running and displays a piece of handwriting, which is input by hand, on the touch-sensitive panel 10. In that case, the display color or the line type of the piece of handwriting that has been input in the state in which the thumb Tm of the user remains in contact with the control region (FIG. 1B) is changed from the display color or the line type of the piece of handwriting that has been input in the state in which the thumb Tm of the user does not make contact with the control region (FIG. 1A); and then the piece of handwriting is displayed on the touch-sensitive panel 10.

Meanwhile, as far as the functions that are subjected to implementation control based on whether or not a finger of the user is in contact with the control region, it is possible to think of various functions. Given below is the explanation of some variations of the information processing device 100 as examples depending on the differences in the function to be subjected to implementation control.

First Example

A first example is an example of application to a note application in which a handwriting input interface is used. In the note application, while displaying, on a touch-sensitive panel, a piece of handwriting that is input by hand by a user, it is possible to change the display color or the line type of the piece of handwriting. In an information processing device according to the first example (hereinafter, referred to as an information processing device 100A), depending on whether or not a finger of the user is in contact with the control region, control is performed with respect to displaying the piece of handwriting that is input by hand by the user. More particularly, in the information processing device 100A according to the first example, the display color or the line type of the piece of handwriting that has been input while a finger of the user remains in contact with the control region is changed from the display color or the line type of the piece of handwriting that has been input while a finger of the user does not make contact with the control region; and then the piece of handwriting is displayed on the touch-sensitive panel 10.

Figure 2:
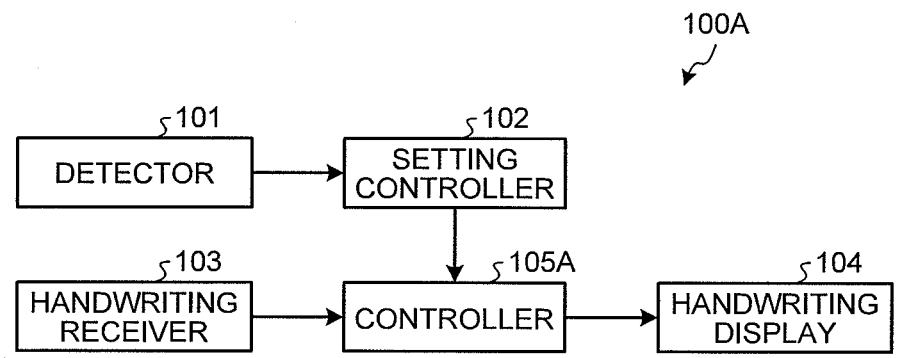
FIG. 2 is a block diagram illustrating an exemplary functional configuration of an information processing device according to a first example.

FIG. 2 is a block diagram illustrating an exemplary functional configuration of the information processing device 100A according to the first example. As illustrated in FIG. 2, the information processing device 100A according to the first example includes a detector 101, a setting controller 102, a handwriting receiver 103, a handwriting display 104, and a controller 105A.

The detector 101 detects the holding position, which represents the position of a finger of the user who is holding the information processing device 100A.

Figure 3:
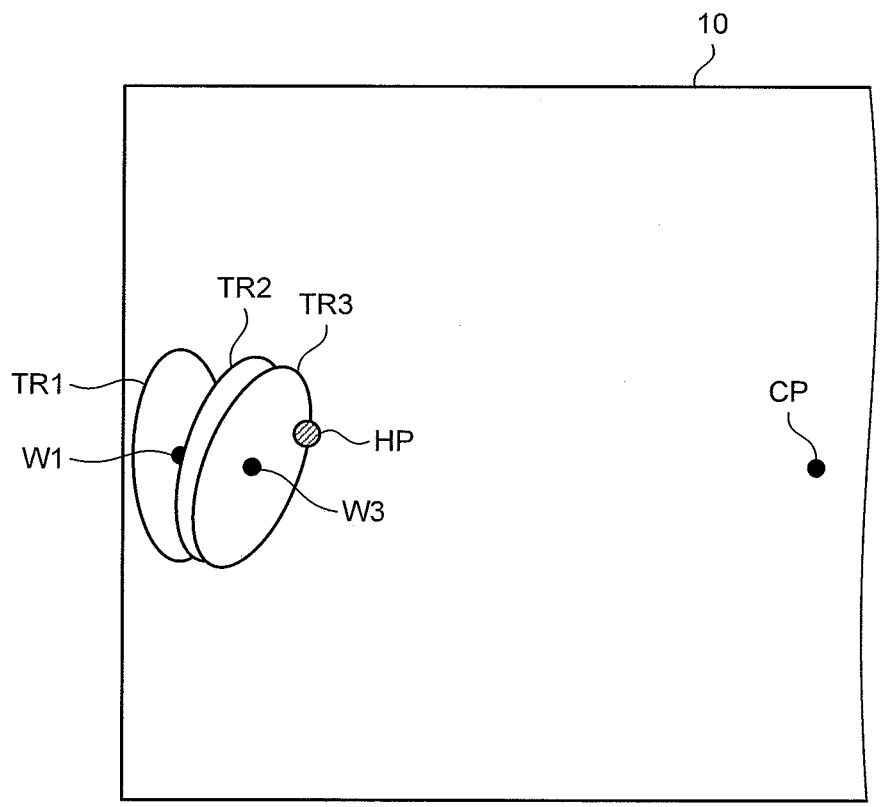
FIG. 3 is a diagram for explaining an example of a method implemented by a detector for detecting a holding position.

FIG. 3 is a diagram for explaining an example of a method implemented by the detector 101 for detecting the holding position HP. As illustrated in FIG. 3, for example, the detector 101 obtains, in chronological order, contact regions TR in which a finger of the user is making contact. With reference to FIG. 3, a contact region TR1 represents the contact region TR obtained at a timing t; a contact region TR2 represents the contact region TR obtained at a timing t+k; and a contact region TR3 represents the contact region TR obtained at a timing t+n (where n>k).

Herein, the contact regions TR either can represent areas on the touch-sensitive panel in which a contact is detected or can represent areas detected by a sensor, such as a pressure sensor or an optical sensor, that is capable of detecting a contact and that is disposed on the frame of the information processing device 100A. Alternatively, a dedicated touch-sensitive panel can be used for the purpose of obtaining the contact regions TR. In that case, such areas on that dedicated touch-sensitive panel in which a contact is detected can be treated as the contact regions TR.

In the case in which the same touch-sensitive panel 10 is used in common for the purpose of receiving a handwritten input and obtaining the contact regions TR; for example, the temporal continuity and the dimension of the input with respect to the touch-sensitive panel 10 is measured. Then, if the data set close to the input position has a relatively small dimension and if the input position has a relatively large amount of movement per unit time, then it is regarded that the input represents a piece of handwriting. Thus, even if the same touch-sensitive panel 10 is used in common, it becomes possible to distinguish between the contact of a finger of the user and a piece of handwriting done by the user. Meanwhile, alternatively, on the touch-sensitive panel 10, the area used for the purpose of receiving a handwritten input can be separated from the area used for the purpose of obtaining the contact regions TR. Moreover, for example, the area within a predetermined range from the frame of the information processing device 100 can be regarded as the area used for the purpose of obtaining the contact regions TR.

Then, the detector 101 obtains a center of gravity position W of each contact region TR obtained in chronological order. If a condition in which the variation in the center of gravity positions W is within a predetermined range goes on for a predetermined period of time, then a predetermined reference position in the contact regions TR is detected as a holding position HP. With reference to FIG. 3, a center of gravity position W1 represents the center of gravity position of the contact region TR1, and a center of gravity position W3 represents the center of gravity position of the contact region TR3.

Herein, by taking into account the unintended movements of fingers of the user who is holding the information processing device 100A, the predetermined range is set to a dimension (such as about 10 mm×10 mm) that enables the determination that the fingers are not intentionally moved. Moreover, the predetermined period of time is set to such a period of time (for example, about 30 seconds) which enables the determination of stationarity. Furthermore, the reference position in the contact regions TR can be set to the closest position, of an area formed by merging the contact regions TR obtained in chronological order, to a center point CP of the touch-sensitive panel 10. Alternatively, the reference position in the contact regions TR can be set to the center of gravity position of the area formed by merging the contact regions TR obtained in chronological order. In FIG. 3 is illustrated an example in which the closest position to the center point CP of the touch-sensitive panel 10 is detected as the holding position HP.

Meanwhile, the method implemented by the detector 101 for detecting the holding position HP is not limited to the example explained above. Alternatively, for example, the configuration can be such that a notification in the form of audio or a screen display is issued to prompt the user to hold the information processing device 100A, and subsequently the reference position in the initially-obtained contact region TR is detected as the holding position HP.

The setting controller 102 sets the control region at a position that is separated by a predetermined distance from the holding position HP, which is detected by the detector 101.

Figure 4:
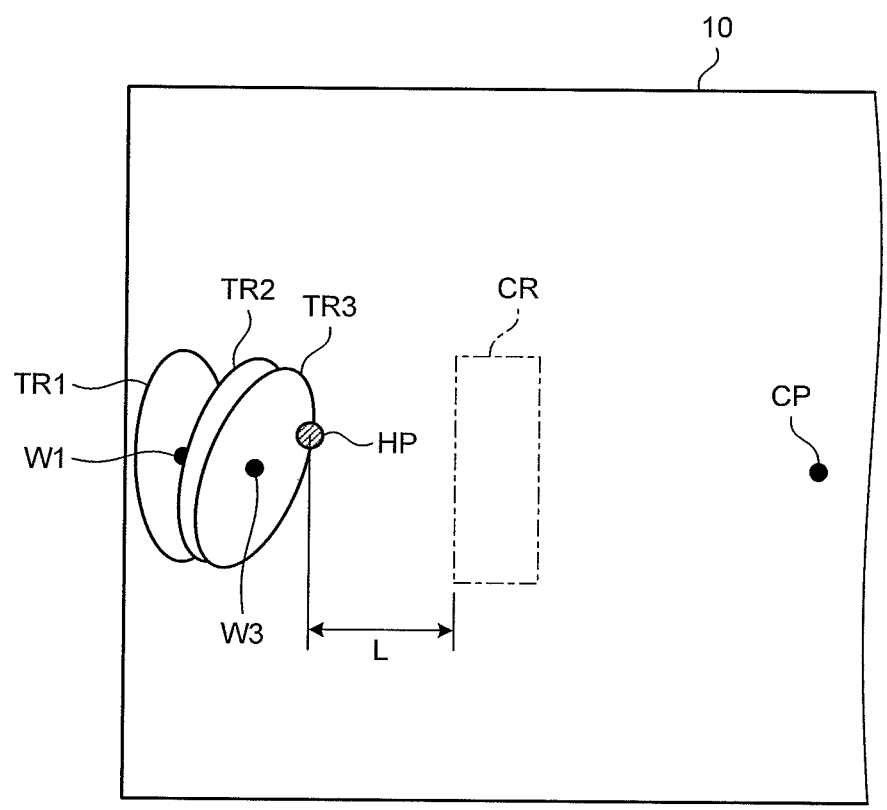
FIG. 4 is a diagram for explaining an example of a method implemented by a setting controller for setting a control region.

FIG. 4 is a diagram for explaining an example of a method implemented by the setting controller 102 for setting the control region. As illustrated in FIG. 4, the setting controller 102 sets a control region CR at a position that is separated by a predetermined distance L from the holding position HP, which is detected by the detector 101, toward the center point CP of the touch-sensitive panel 10. Herein, the control region CR can have an arbitrary shape. For example, as illustrated in FIG. 4, the control region CR can have an oblong shape. The predetermined distance L is set to, for example, about 30 mm based on the range of movement of the thumb of an average user as described above. Meanwhile, the control region CR can also be set at a tilt with respect to the frame of the information processing device 100A. In that case, the control region CR is set in such a way that the closest position thereof to the holding position HP is separated by the predetermined distance L from the holding position HP.

Herein, setting the control region CR implies temporarily storing (holding) such sets of coordinates on the touch-sensitive panel 10 that enable identifying at least the boundary of the control region CR. Although it is not necessary to explicitly display the set control portion CR on the touch-sensitive panel 10, the control region CR may be displayed on the touch-sensitive panel 10 in a visually-recognizable manner.

The handwriting receiver 103 receives input of a piece of handwriting of a user via the handwriting input interface. For example, the handwriting receiver 103 recognizes, as a piece of handwriting, the locus of the contact positions from the time when a pen or a finger makes contact with the touch-sensitive panel 10 until the pen or the finger is lifted from the touch-sensitive panel 10. The input of a piece of handwriting received by the handwriting receiver 103 is managed in the form of handwriting data. Herein, the handwriting data contains a handwriting number, which enables identification of the piece of handwriting, and time-series coordinates of a plurality of points in the locus that is formed by the movement of a pen or a finger while making contact with the touch-sensitive panel 10. The handwriting number is incremented in chronological order of generation of the handwriting data.

The handwriting display 104 is configured with, for example, the touch-sensitive panel 10; and displays the piece of handwriting, which is received by the handwriting receiver 103, under the control of the controller 105A.

The controller 105A controls, based on whether or not a finger of the user is touching the control region CR that is set by the setting controller 102, the handwriting display by the handwriting display 104. For example, if the black color is the default display color for handwriting; then, regarding a piece of handwriting which is input during the period of time in which a finger of the user is in contact with the control region CR, the controller 105A controls the handwriting display by the handwriting display 104 in such a way that the piece of handwriting is displayed in another color such as the red color other than the black color. Moreover, regarding the piece of handwriting which is input during the period of time in which a finger of the user is in contact with the control region CR, the controller 105A controls the handwriting display by the handwriting display 104 in such a way that the piece of handwriting is displayed with a different line type than the default line type, for example, displayed with a heavy line that is thicker than the default line.

Herein, whether or not a finger of the user is touching the control region CR can be determined, for example, by monitoring the input to the touch-sensitive panel 10 and by checking whether or not a contact region TR on the touch-sensitive panel 10 overlaps with the control region CR. More particularly, on the touch-sensitive panel 10, if the coordinates of the center of gravity position W of a contact region TR are included in a range of coordinates of the control region CR; then it is determined that a finger of the user is touching the control region CR.

Meanwhile, the controller 105A can change the control details depending on the number of times of brief contact with respect to the control region CR. For example, prior to the input of a piece of handwriting, if there is no brief contact with the control region CR; then the piece of handwriting that is input during the period of time in which a finger of the user is in contact with the control region CR may be changed to have the red color as its display color. Moreover, prior to the input of a piece of handwriting, if there is a single brief contact with the control region CR; then the piece of handwriting that is input during the period of time in which a finger of the user is in contact with the control region CR may be changed to have the red color as its display color. Furthermore, prior to the input of a piece of handwriting, if there are two brief contacts with the control region CR; then the piece of handwriting that is input during the period of time in which a finger of the user is in contact with the control region CR may be displayed with a heavy line. Meanwhile, such changes in the control details can be performed, for example, in response to the operation of a switch button that is separately disposed.

Figure 5:
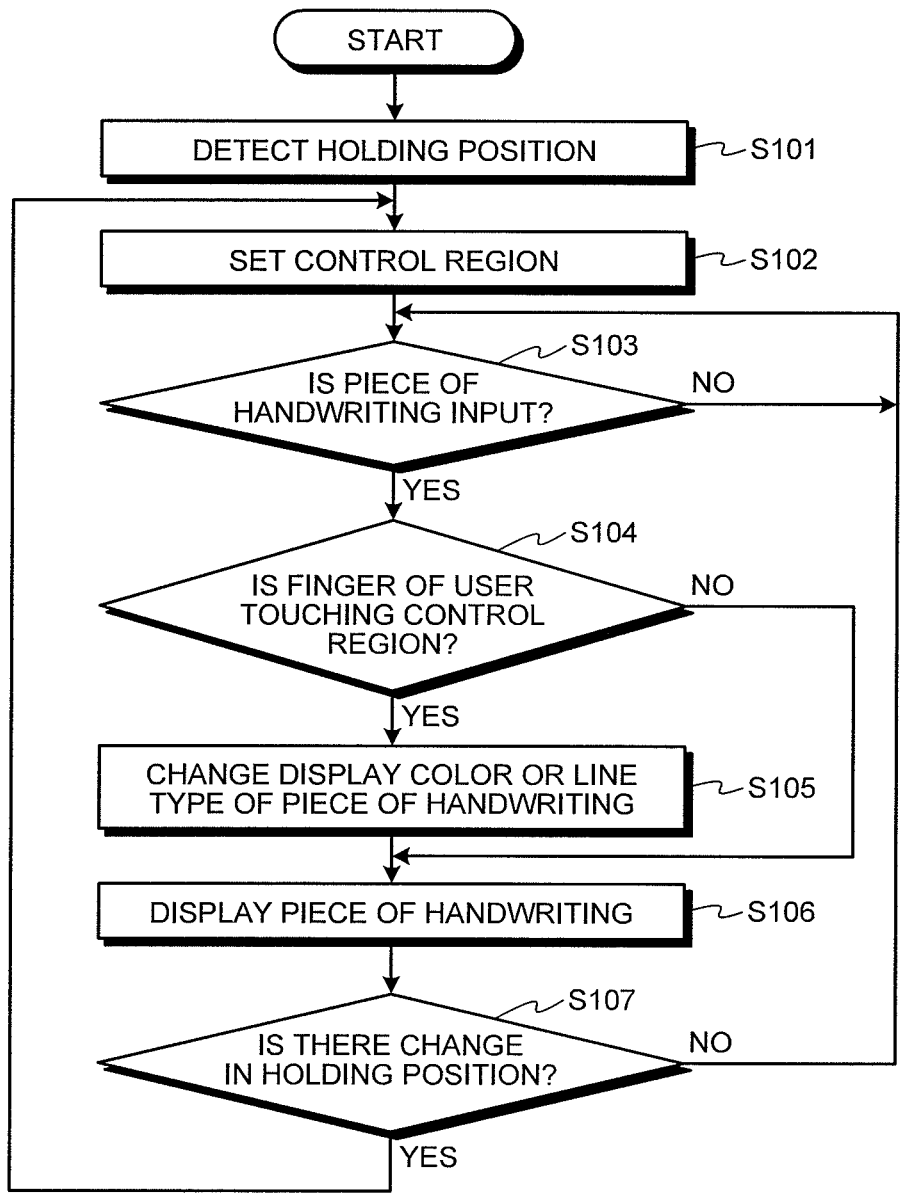
FIG. 5 is a flowchart for explaining the operations performed in the information processing device according to the first example.

FIG. 5 is a flowchart for explaining the operations performed in the information processing device 100A according to the first example. The sequence of operations illustrated in the flowchart in FIG. 5 starts with the start of execution of a note application and ends with the end of the note application.

Once the execution of the note application is started; firstly, the detector 101 detects the holding position HP (Step S101). Then, the setting controller 102 sets the control portion CR at a position separated by a predetermined distance from the holding position HP, which is detected by the detector 101 (Step S102).

Subsequently, when the handwriting receiver 103 starts receiving input of a piece of handwriting, the controller 105A determines whether or not the piece of handwriting has been input (Step S103). If the piece of handwriting is not yet input (No at Step S103), then the controller 105A waits till the piece of handwriting is input. Once the piece of handwriting is input (Yes at Step S103), the controller 105A determines whether or not a finger of the user is touching the control region CR that has been set by the setting controller 102 (Step S104).

If a finger of the user is touching the control region CR (Yes at Step S104), then the controller 105A changes the display color or the line type of the piece of handwriting that has been input (Step S105). However, if no finger of the user is touching the control region CR (No at Step S104), then the display color or the line type of the piece of handwriting remains same as the default settings. Then, the handwriting display 104 displays the input piece of handwriting either using the display color or the line type changed at Step S105 or using the display color or the line type according to the default setting (Step S106).

Subsequently, it is determined whether or not there is a change in the holding position HP (Step S107). If there is no change in the holding position (No at Step S107), then the system control returns to Step S103 and an input of the next piece of handwriting is awaited. On the other hand, if there is a change in the holding position HP (Yes at Step S107), then the system control returns to Step S102. Then, the setting controller 102 newly sets the control region CR at a position that is separated by a predetermined distance from the new holding position HP. The subsequent operations are then repeated.

As described above, in the information processing device 100A according to the first example, at a position separated by a predetermined distance from the holding position HP, the control region CR is set for the purpose of changing the display color or the line type of a piece of handwriting. With that, without having to stop inputting the piece of handwriting, the user becomes able to change the display color or the color type of the piece of handwriting by performing a simple operation in which the control region CR is touched by only moving a finger while holding the information processing device 100A.

Second Example

A second example is an example of application to a search application in which a handwriting input interface is used. In the search application, information can be searched using a piece of handwriting that is input by hand by a user. For example, if pieces of handwriting that have been input in the past by a user are stored along with background information (such as text or images) that was displayed as the background of the concerned pieces of handwriting, then the past pieces of handwriting and the respective pieces of background information that are similar to the piece of handwriting that is currently being input by the user can be retrieved as the search results. Alternatively, a search can be performed based on the background information of a piece of handwriting that is input by a user, and the search results can be retrieved from both inside and outside the device (i.e., from a memory unit in the device and from websites on the Internet). An information processing device according to the second example (hereinafter, referred to as an information processing device 100B) performs such an information search using a piece of handwriting that is input during the period of time in which a finger of the user is in contact with the control region CR.

Figure 6:
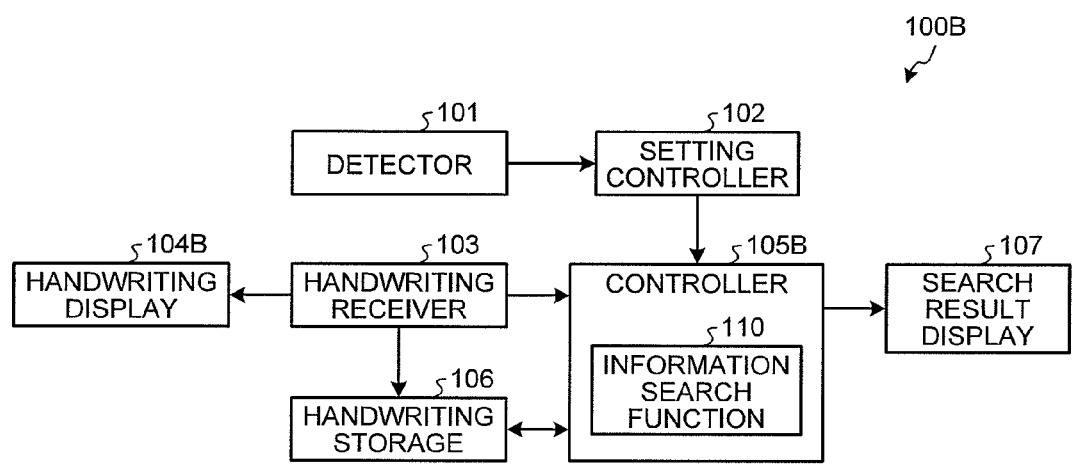
FIG. 6 is a block diagram illustrating an exemplary functional configuration of an information processing device according to a second example.

FIG. 6 is a block diagram illustrating an exemplary functional configuration of the information processing device 100B according to the second example. As illustrated in FIG. 6, the information processing device 100B according to the second example includes the detector 101, the setting controller 102, the handwriting receiver 103, a handwriting display 104B, a handwriting storing unit 106, a controller 105B, and a search result display unit 107. Herein, the detector 101, the setting controller 102, and the handwriting receiver 103 are common constituent elements with the first example. Hence, the explanation of those constituent elements is not repeated.

The handwriting display 104B is configured with some portion of the touch-sensitive panel 10 (for example, the portion in the right half of the entire display area of the touch-sensitive panel 10), and displays an input piece of handwriting that is received by the handwriting receiver 103. The display area used as the handwriting display 104B is particularly called a handwriting display area.

The handwriting storing unit 106 is used to store an input piece of handwriting, which is received by the handwriting receiver 103, in a corresponding manner to the background information that was being displayed in the handwriting display area as the background of the piece of handwriting. As described above, the piece of handwriting received by the handwriting receiver 103 is managed in the form of handwriting data and is stored in the handwriting storing unit 106. At that time, the background information, such as a text or an image, that was being displayed as the background of the piece of handwriting is associated to the handwriting data and stored in the handwriting storing unit 106 along with the handwriting data.

As far as the background information, which is stored in the handwriting storing unit 106 along with the handwriting data, is concerned; the image that was displayed in the handwriting display area along with the piece of handwriting can be used in entirety or in part. For example, of the image that was displayed in the handwriting display area along with the piece of handwriting, information regarding the area that is cut out by the bounding rectangle of the piece of handwriting can be stored as the background information in the handwriting storing unit 106. Alternatively, of the image that was displayed in the handwriting display area along with the piece of handwriting, information present within the range of a predetermined distance from the center of the piece of handwriting can be cut out and stored as the background information in the handwriting storing unit 106. Still alternatively, the image that was displayed in the handwriting display area along with the piece of handwriting can be partitioned by area units such as a text area and an image area, and information regarding the area through which the piece of handwriting passes can be stored as the background information in the handwriting storing unit 106.

The controller 105B controls the implementation of an information search function 110 depending on whether or not a finger of the user is touching the control region CR that has been set by the setting controller 102. Herein, regarding the method of determining whether or not a finger of the user is touching the control region CR, the same method as the method according to the first example is implemented. The information search function 110 is implemented by a search engine and includes, for example, a "handwriting search" function, a "text search" function, and an "image search" function.

The "handwriting search" function represents a function for collating an input piece of handwriting, which is received by the handwriting receiver 103, with the past pieces of handwriting stored in the handwriting storing unit 106; and retrieving, as the search results, past pieces of handwriting and the respective pieces of past background information that are similar to the input piece of handwriting received by the handwriting receiver 103. While searching for information using the "handwriting search" function, the controller 105B obtains, as the search results, past pieces of handwriting, from among the past pieces of handwriting stored in the handwriting storing unit 106, and the respective pieces of past background information that are similar to the piece of handwriting which is input during the period of time in which a finger of the user is in contact with the control region CR.

Herein, the similarity between pieces of handwriting is determined by comparing the feature quantities of those pieces of handwriting. For example, as is the case in character recognition, the feature quantity based on the direction of a piece of handwriting can be used as the feature quantity of that piece of handwriting. More particularly, the bounding rectangle of a piece of handwriting is segmented in S×S number of localized regions; the direction of the piece of handwriting in each localized region is quantized with a fixed number D; and a histogram of the direction of the piece of handwriting is calculated for each localized region. As a result, for each of the S×S number of localized regions, a D-dimensional histogram is obtained. Such histograms in S×S×D dimensional directions can be used as the feature quantity of the piece of handwriting.

Meanwhile, the feature quantity of a piece of handwriting need not be based on the direction of the piece of handwriting as described above. Alternatively, for example, if a piece of handwriting is treated as an image, then the feature quantity, such as the frequency components or the edges, representing a feature of the piece of handwriting can be used individually or in combination. Moreover, in the second example, as the search results, past pieces of handwriting and the respective pieces of past background information are obtained that are similar to the input piece of handwriting received by the handwriting receiver 103. However, alternatively, the input piece of handwriting received by the handwriting receiver 103 can be treated as an image, and the information similar to that image can be retrieved as the search results from both inside and outside the device.

The "text search" function represents a function to search for information based on the text included in the background of an input piece of handwriting received by the handwriting receiver 103. For example, the text included in the background within a predetermined range from the position of the piece of handwriting is subjected to morphological analysis so as to extract words therefrom. Then, a search is performed using the extracted words as keywords; and information similar to the text included in the background of the piece of handwriting (i.e., information such as document data or website screens containing the words that are used as keywords in the search) is obtained as the search results from both inside and outside the device. While searching for information by implementing the "text search" function, the controller 105B searches for information based on the text included in the background of the piece of handwriting that is input during the period of time in which a finger of the user is in contact with the control region CR, and obtains the search results from both inside and outside the device.

For example, the information obtained as the search results of the "text search" function either can be the entire document data or the entire website screens or can be a portion of the document data or the website screens that contains the words used as the search keywords. For example, from a website screen, a predetermined range around the words that are used as the search keywords can be clipped and obtained as the search result. Alternatively, if a website screen is drawn using structured data that has been tagged, then the information present in the inter-tag areas including the words used as the search keywords can be obtained as the search results.

The "image search" function represents a function to search for information based on images included in the background of an input piece of handwriting received by the handwriting receiver 103. For example, the edge feature is extracted from the image included in the background within a predetermined range from the position of the piece of handwriting; and images having the similar edge feature can be obtained as the search results from both inside and outside the device. The feature of the image to be used in a search is not limited to the edge feature. Alternatively, it is possible to use any feature quantity that represents a feature of the image. While searching for information by implementing the "image search" function, the controller 105B searches for information based on the image included in the background of the piece of handwriting that is input during the period of time in which a finger of the user is in contact with the control region CR, and obtains the search results from both inside and outside the device.

The information obtained as the search results of the "image search" function can be images similar to the image used in the search. Alternatively, when the images are part of website screens, then the obtained information can be the entire website screens. Meanwhile, it is also possible to perform character recognition with respect to the input piece of handwriting received by the handwriting receiver 103. Then, a search can be performed using the obtained words as the keywords, and images can be obtained as the search results from both inside and outside the device.

The information search function 110 that is implemented under the control of the controller 105B can be any one of the "handwriting search" function, the "text search" function, and the "image search" function described above, or can be a combination of two or more of those functions. The function to be implemented as the information search function 110 can be selected based on a user specification given prior to starting a search application. Alternatively, even after a search application is started; for example, the function to be implemented as the information search function 110 can be changed depending on the number of times of brief contact with respect to the central region CR as described in the first example. Still alternatively, the function to be implemented as the information search function 110 can be changed, for example, in response to the operation of a switch button that is separately disposed.

The search result display unit 107 is configured with, for example, some portion of the touch-sensitive panel 10 that is not used as the handwriting display area (for example, the portion in the left half of the entire display area of the touch-sensitive panel 10), and displays the information obtained as the search results by the information search function 110 of the controller 105B. In the following explanation, the display area used by the search result display unit 107 is called a search result display area. If a plurality of pieces of information is obtained as the search results by implementing the information search function 110; then it is desirable that the search result display unit 107 displays the plurality of pieces of information in such a way that higher the priority of a piece of information as the search result, the closer is the display position of that piece of information from the center point of the search result display area. Moreover, it is desirable that the search result display unit 107 displays the plurality of piece of information obtained as the search results in such a way that the higher the priority of a piece of information as the search result, the larger is the display size of that piece of information when displayed by.

Moreover, for example, if the information search function 110 of the controller 105B performs a search from a plurality of viewpoints; then, for each viewpoint, the search result display unit 107 arranges the information obtained as the search results along a plurality of viewpoint axes extending in different directions from the center point of the search result display area. A search performed from a plurality of viewpoints indicates a search performed by combining two or more functions of the "handwriting search" function, the "text function", and the "image function" described above or indicates a compound retrieval performed from a plurality of viewpoints having different valuation bases of the degree of similarity. In such a case too, regarding the viewpoint-by-viewpoint information arranged on each viewpoint axis; it is desirable that, the higher the priority of a piece of information as the search result, the closer is the display position of that piece of information from the center point of the search result display area. Moreover, it is desirable that, the higher the priority of a piece of information as the search result, the larger is the display size of that piece of information.

Figure 7:
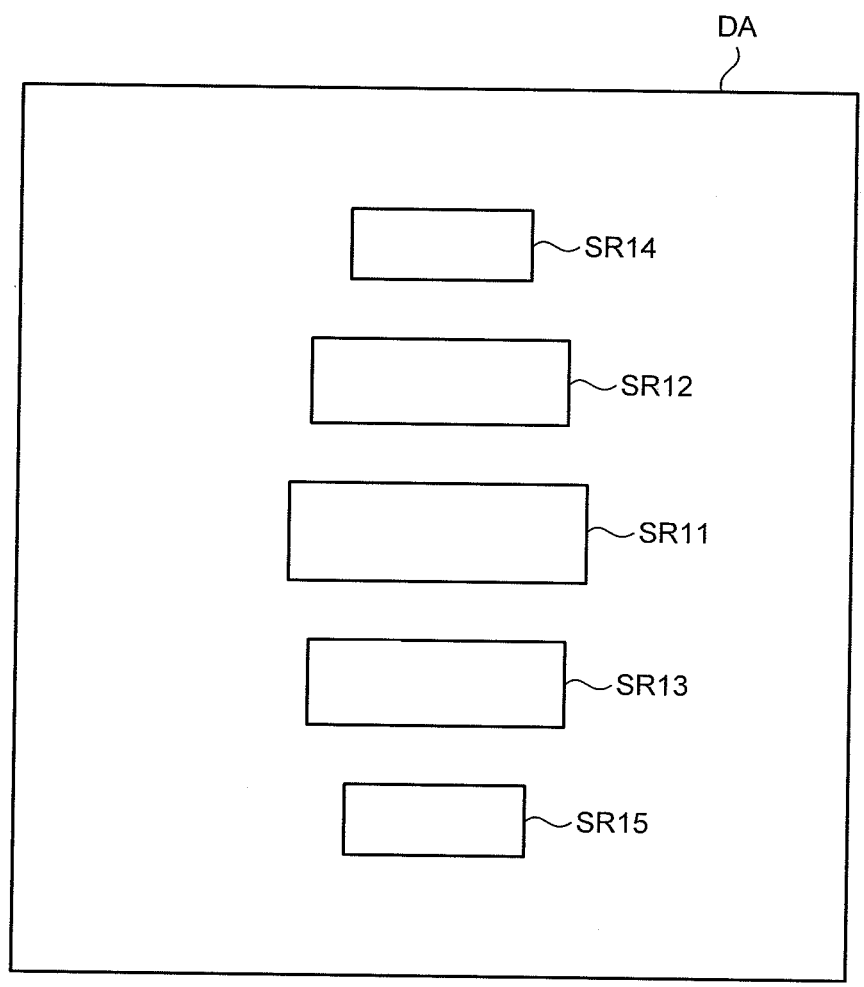
FIG. 7 is a diagram illustrating an example of a display screen that is displayed in a search result display area.

FIG. 7 is a diagram illustrating an example of a display screen that is displayed in a search result display area DA. In FIG. 7 is illustrated an example of a screen in which five search results SR11, SR12, SR13, SR14, and SR15 are displayed that are obtained as a result of a search carried out by implementing the "handwriting search" function. Of the five search results, the search result SR11 that is displayed at the center point of the search result display area DA represents the search result having the highest degree of handwriting similarity. Moreover, the search result SR12 and the search result SR13 that are displayed adjacent to the search result SR11 represent the search results having the next highest degree of handwriting similarity after the degree of handwriting similarity of the search result SR11. Furthermore, the search result SR14 that is displayed adjacent to the search result SR12 and the search result SR15 that is displayed adjacent to the search result SR13 represent the search results having the next highest degree of handwriting similarity after the degree of handwriting similarity of the search result SR12 and the search result SR13.

Herein, the configuration can be such that the search results SR11, SR12, SR13, SR14, and SR15 either display, without modification, the information obtained from the handwriting storing unit 106 as a result of implementing the "handwriting search" or display, in a processed form, the information obtained from the handwriting storing unit 106. Alternatively, links to the information storage locations in the handwriting storing unit 106 can also be displayed as the search results SR11, SR12, SR13, SR14, and SR15. In that case, when an arbitrary link is selected by means of a touch operation, the corresponding information is obtained from the handwriting storing unit 106 and is displayed in the search result display area DA.

As illustrated in FIG. 7, the higher the degree of handwriting similarity of a search result, that is, the higher the priority of a search result; the closer is the display position of that search result from the center point of the search result display area DA and the larger is the display size of that search result when displayed by the search result display unit 107.

Figure 8:
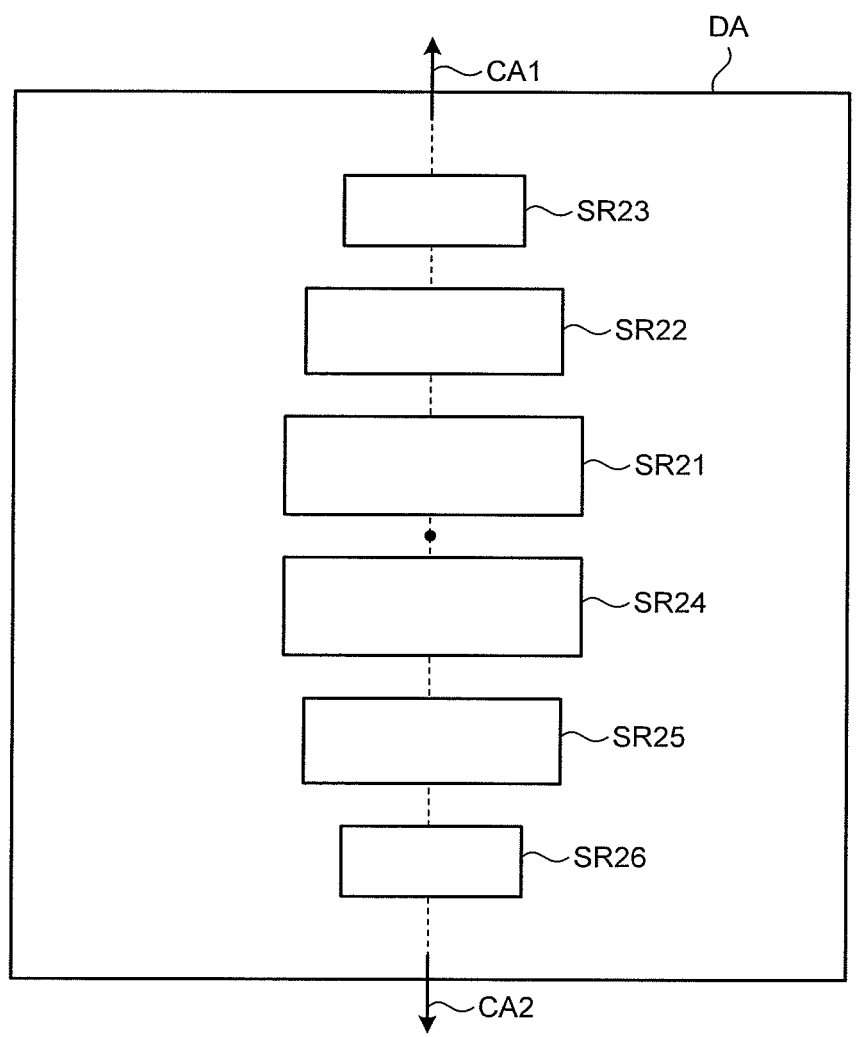
FIG. 8 is a diagram illustrating another example of the display screen that is displayed in the search result display area.

FIG. 8 is a diagram illustrating another example of the display screen that is displayed in the search result display area DA. In FIG. 8 is illustrated an example of a screen in which six search results SR21, SR22, SR23, SR24, SR25, and SR26 are displayed that are obtained as a result of a search performed by implementing a combination of the "handwriting search" function and the "text search" function. Of these search results, the search results SR21, SR22, and SR23 represent the search results obtained from the handwriting storing unit 106 as a result of implementing the "handwriting search" function. Herein, the search result SR21 has the highest degree of handwriting similarity, the search result SR22 has the second highest degree of handwriting similarity, and the search result SR23 has the third highest degree of handwriting similarity.

The search results SR24, SR25, and SR26 represent information obtained from, for example, websites outside the device as a result of implementing the "text search" function. The search result SR24 has the highest priority (the highest degree of text similarity), the search result SR25 has the second highest priority (the second highest degree of text similarity), and the search result SR26 has the third highest priority (the third highest degree of text similarity). Herein, the configuration can be such that the search results SR24, SR25, and SR26 either display, without modification, the information obtained from, for example, websites outside the device as a result of implementing the "text search" function or display the obtained information in a processed form. Alternatively, links to the websites can also be displayed as the search results SR24, SR25, and SR26. In that case, when an arbitrary link is selected by means of a touch operation, information is obtained from the corresponding website and is displayed in the search result display area DA.

As illustrated in FIG. 8, the search result display unit 107 arranges the search results SR21, SR22, and SR23, which are obtained as a result of implementing the "handwriting search" function, along a handwriting similarity axis CA1 that is a viewpoint axis extending in the upward direction from the center point of the search result display area DA. Moreover, the search result display unit 107 arranges the search results SR24, SR25, and SR26, which are obtained as a result of implementing the "text search" function, along a text similarity axis CA2 that is a viewpoint axis extending in the downward direction from the center point of the search result display area DA. Furthermore, on each viewpoint axis, the higher the priority of a search result, the closer is the display position of that search result from the center point of the search result display area DA and the larger is the display size of that search result when displayed by the search result display unit 107.

Figure 9:
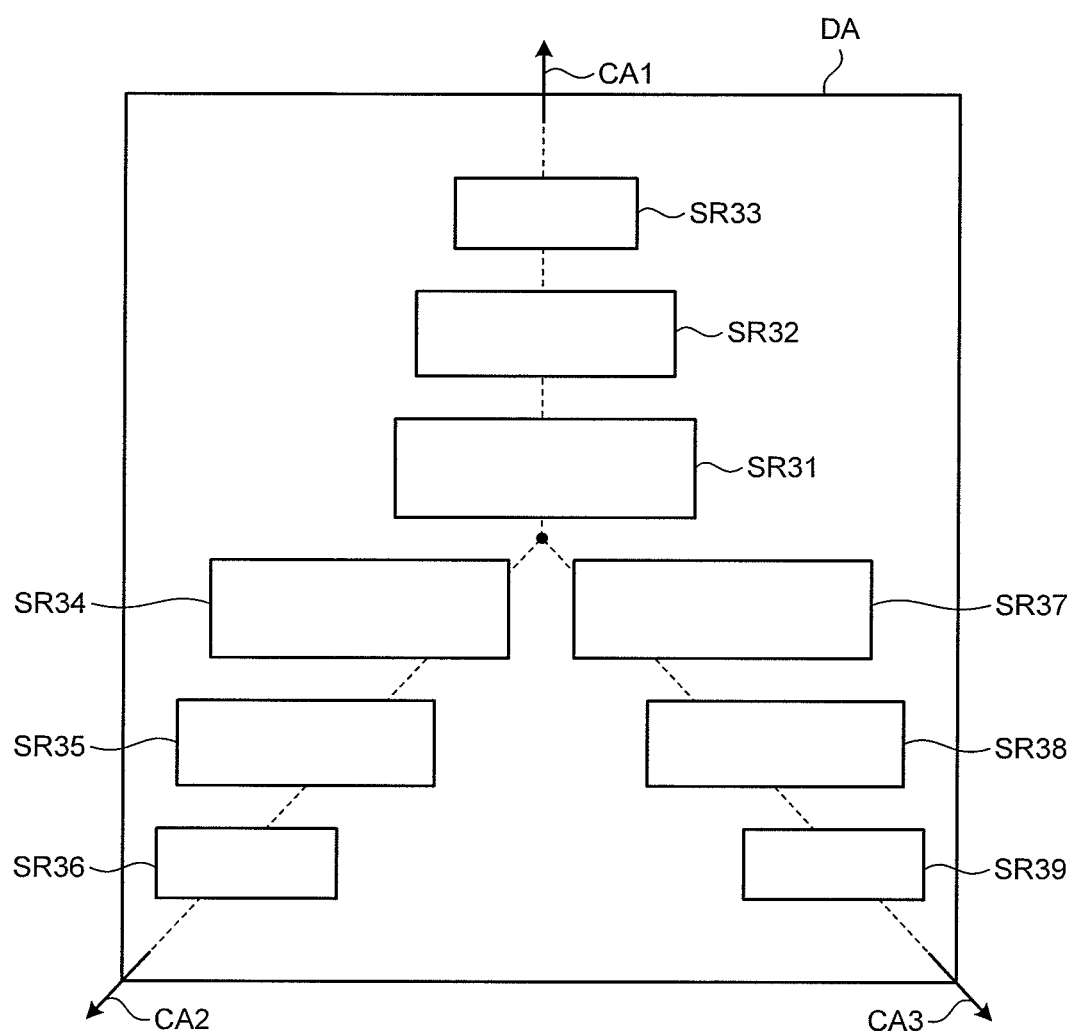
FIG. 9 is a diagram illustrating still another example of the display screen that is displayed in the search result display area.

FIG. 9 is a diagram illustrating still another example of the display screen that is displayed in the search result display area DA. In FIG. 9 is illustrated an example of a screen in which nine search results SR31, SR32, SR33, SR34, SR35, SR36, SR37, SR38, and SR39 are obtained as a result of a search performed by implementing a combination of the "handwriting search" function, the "text search" function, and the "image search" function. Of these search results, the search results SR31, SR32, and SR33 represent the search results obtained from the handwriting storing unit 106 as a result of implementing the "handwriting search" function. Herein, the search result SR31 has the highest degree of handwriting similarity, the search result SR32 has the second highest degree of handwriting similarity, and the search result SR33 has the third highest degree of handwriting similarity.

The search results SR34, SR35, and SR36 represent information obtained from, for example, websites outside the device as a result of implementing the "text search" function. The search result SR34 has the highest priority (the highest degree of text similarity), the search result SR35 has the second highest priority (the second highest degree of text similarity), and the search result SR36 has the third highest priority (the third highest degree of text similarity).

The search results SR37, SR38, and SR39 represent information obtained from, for example, an image storing unit in the device as a result of implementing the "image search" function. The search result SR37 has the highest priority (the highest degree of image similarity), the search result SR38 has the second highest priority (the second highest degree of image similarity), and the search result SR39 has the third highest priority (the third highest degree of image similarity). Herein, the configuration can be such that the search results SR37, SR38, and SR39 either display, without modification, the information obtained from, for example, the image storing unit in the device as a result of implementing the "image search" function or display the obtained information in a processed form. Alternatively, links to the information storage locations in the image storing unit can also be displayed as the search results SR37, SR38, and SR39. In that case, when an arbitrary link is selected by means of a touch operation, the corresponding information is obtained from the image storing unit in the device and is displayed in the search result display area DA.

As illustrated in FIG. 9, the search result display unit 107 arranges the search results SR31, SR32, and SR33, which are obtained as a result of implementing the "handwriting search" function, along the handwriting similarity axis CA1 that is a viewpoint axis extending in the upward direction from the center point of the search result display area DA. Moreover, the search result display unit 107 arranges the search results SR34, SR35, and SR36, which are obtained as a result of implementing the "text search" function, along the text similarity axis CA2 that is a viewpoint axis extending in the downward direction from the center point of the search result display area DA. Furthermore, the search result display unit 107 arranges the search results SR37, SR38, and SR39, which are obtained as a result of implementing the "image search" function, along an image similarity axis CA3 that is a viewpoint axis extending in the lower right direction from the center point of the search result display area DA. Moreover, on each viewpoint axis, the higher the priority of a search result, the closer is the display position of that search result from the center point of the search result display area DA and the larger is the display size of that search result when displayed by the search result display unit 107.

Figure 10:
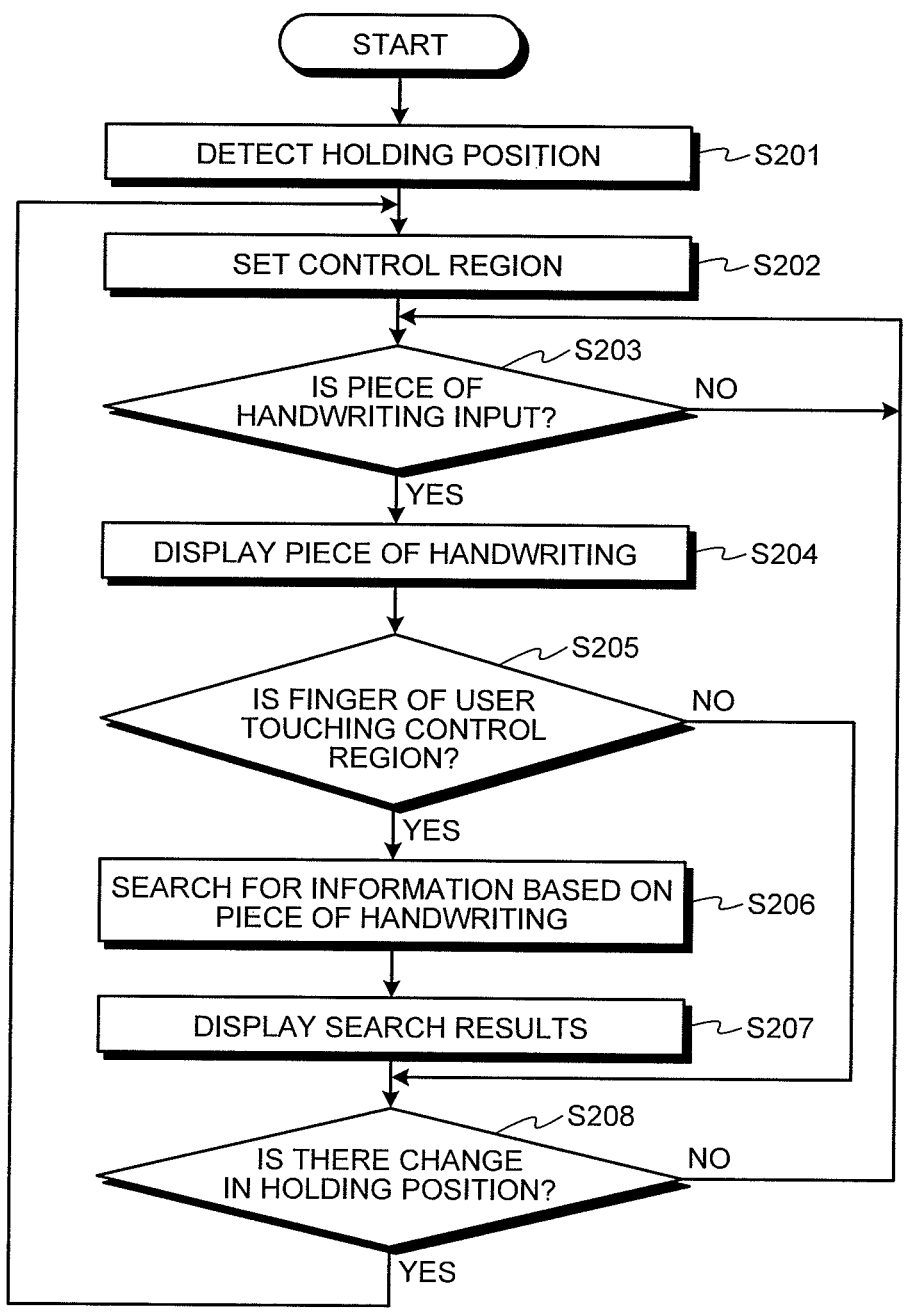
FIG. 10 is a flowchart for explaining the operations performed in the information processing device according to the second example.

FIG. 10 is a flowchart for explaining the operations performed in the information processing device 100B according to the second example. The sequence of operations illustrated in the flowchart in FIG. 10 starts with the start of execution of a search application and ends with the end of the search application.

Once the execution of the search application is started; firstly, the detector 101 detects the holding position HP (Step S201). Then, the setting controller 102 sets the control portion CR at a position separated by a predetermined distance from the holding position HP, which is detected by the detector 101 (Step S202).

Subsequently, when the handwriting receiver 103 starts receiving input of a piece of handwriting, the handwriting display 104B determines whether or not the piece of handwriting has been input (Step S203). If the piece of handwriting is not yet input (No at Step S203), then the handwriting display 104B waits till the piece of handwriting is input. Once the piece of handwriting is input (Yes at Step S203), the handwriting data 104B displays the input piece of handwriting in the handwriting display area (Step S204) and the controller 105B determines whether or not a finger of the user is touching the control region CR that has been set by the setting controller 102 (Step S205).

If a finger of the user is touching the control region CR (Yes at Step S205), then the controller 105B implements the information search function 110 to search for information based on the input piece of handwriting and obtains the search results (Step S206). Then, the search result display unit 107 displays the information obtained as the search results in the search result display area (Step S207). Meanwhile, if no finger of the user is touching the control region CR (No at Step S205), then the operations at Step S206 and Step S207 are not performed.

Then, it is determined whether or not there is a change in the holding position HP (Step S208). If there is no change in the holding position (No at Step S208), then the system control returns to Step S203 and an input of the next piece of handwriting is awaited. On the other hand, if there is a change in the holding position HP (Yes at Step S208), then the system control returns to Step S202. Then, the setting controller 102 newly sets the control region CR at a position separated by a predetermined distance from the new holding position HP. The subsequent operations are then repeated.

As described above, in the information processing device 100B according to the second example, at a position separated by a predetermined distance from the holding position HP, the control region CR is set for the purpose of enabling issuing instructions to search for information using an input piece of handwriting. With that, by performing a simple operation in which the control region CR is touched by only moving a finger while holding the information processing device 100B, the user becomes able to perform a search for information using the input piece of handwriting and to obtain the desired search results.

Moreover, in the information processing device 100B according to the second example, based on the input piece of handwriting, it becomes possible to efficiently obtain past pieces of handwriting and the respective pieces of background information, or to efficiently obtain a variety of information such as the text and images similar to the background of the input piece of handwriting.

Furthermore, in the information processing device 100B according to the second example, regarding the information obtained as the search results, the higher the priority of a search result, the closer is the display position of that search result from the center point of the search result display area. Moreover, the higher the priority of a search result, the larger is the display size of that search result. Therefore, it becomes possible to efficiently present the search results to the user.

Moreover, in the information processing device 100B according to the second example, when a search is performed from a plurality of viewpoints; then, for each viewpoint, the information obtained as the search result is arranged and displayed along a plurality of viewpoint axes extending in different directions from the center point of the search result display area. Therefore, it becomes possible to present the search results in an easy-to-understand manner to the user.

Third Example

A third example is an example of application to a search application in an identical manner to the second example. However, the third example is an example of application to a search application that mainly searches for sound. For example, when a piece of handwriting that is input in the past by the user has been stored along with the ambient sound (such as voices or music), then it is possible to obtain, as search results, past pieces of handwriting and respective ambient sounds that are similar to the piece of handwriting being currently input by the user; or to obtain, as search results, past ambient sounds and respective pieces of handwriting that are similar to the present ambient sound. Moreover, if the ambient sound during the input of a piece of handwriting indicates music, then music similar to that music can be obtained as search results from both inside and outside the device (such as from a music storing unit in the device and from external websites on the Internet). An information processing device according to the third example (hereinafter, referred to as an information processing device 100C) performs such a search for sounds using the piece of handwriting that is input during the period of time in which a finger of the user is in contact with the control region CR and using the ambient sound obtained along with the input piece of handwriting.

Figure 11:
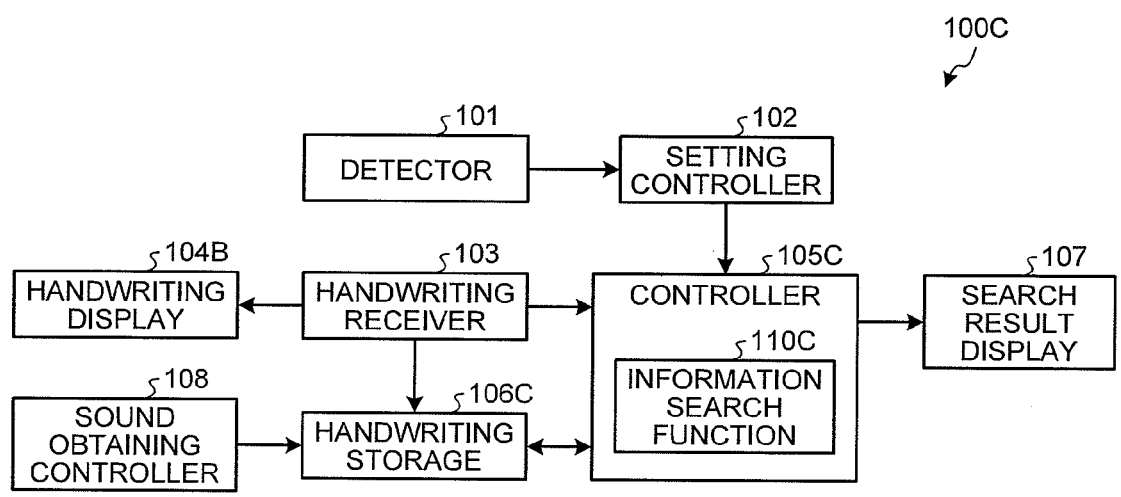
FIG. 11 is a block diagram illustrating an exemplary functional configuration of an information processing device according to a third example.

FIG. 11 is a block diagram illustrating an exemplary functional configuration of the information processing device 100C according to the third example. As illustrated in FIG. 11, the information processing device 100C according to the third example includes the detector 101, the setting controller 102, the handwriting receiver 103, the handwriting display 104B, a sound obtaining unit 108, a handwriting storing unit 106C, a controller 105C, and the search result display unit 107. Herein, the detector 101, the setting controller 102, and the handwriting receiver 103 are common constituent elements with the first example. Moreover, the handwriting display 104B and the search result display unit 107 are common constituent elements with the second example. Hence, the explanation of those constituent elements is not repeated.

The sound obtaining unit 108 obtains (records) ambient sound, which is generated around the information processing device 100C, through, for example, a microphone and holds the ambient sound. Herein, regardless of whether or not a piece of handwriting is input, the sound obtaining unit 108 obtains the ambient sound on a continuous basis. Then, of the ambient sounds held by the sound obtaining unit 108, the ambient sound obtained from a point of time earlier by a certain period of time than the point of time of inputting a piece of handwriting to a point of time later than the point of time of completing the input of the piece of handwriting is stored in the handwriting storing unit 106C in a corresponding manner to the input piece of handwriting. Meanwhile, the interval of the ambient sound to be stored can also be selected from the following: the interval during which the user is inputting a piece of handwriting; or when it can be determined that the piece of handwriting has a continuous input sound, the interval during which the input sound of the piece of handwriting is continuous; or when the input of the piece of handwriting has a frequency characteristic, the interval during which the sound having a similar frequency characteristic is present. Meanwhile, of the ambient sound obtained by the sound obtaining unit 108, the ambient sound that is not stored in the handwriting storing unit 106C is destroyed.

The handwriting storing unit 106C is used to store the input piece of handwriting, which is received by the handwriting receiver 103, along with the ambient sound obtained by the sound obtaining unit 108 during the input of the piece of handwriting. As described above, the input piece of handwriting that is received by the handwriting receiver 103 is managed in the form of handwriting data and is stored in the handwriting storing unit 106C. At that time, data of the ambient sound, which is obtained by the sound obtaining unit 108 during a handwriting input time period including a certain period of time before and after the input of the piece of handwriting, is associated with the handwriting data and is stored along with the handwriting data in the handwriting storing unit 106C.

The controller 105C controls the implementation of an information search function 110C depending on whether or not a finger of the user is touching the control region CR that has been set by the setting controller 102. Herein, regarding the method of determining whether or not a finger of the user is touching the control region CR, the same method as the method according to the first example is implemented. The information search function 110C is implemented by a search engine and includes, for example, the "handwriting search" function, an "ambient sound search" function, and a "music search" function.

The "handwriting search" function represents a function for collating the input piece of handwriting, which is received by the handwriting receiver 103, with the past pieces of handwriting stored in the handwriting storing unit 106; and retrieving, as the search results, past pieces of handwriting and the respective ambient sounds similar to the input piece of handwriting received by the handwriting receiver 103. While searching for information using the "handwriting search" function, the controller 105C obtains, as the search results, past pieces of handwriting, from among the past pieces of handwriting stored in the handwriting storing unit 106C, and the respective ambient sounds that are similar to the piece of handwriting which is input during the period of time in which a finger of the user is in contact with the control region CR. Herein, the similarity between pieces of handwriting can be determined in an identical manner to the second example.

The "ambient sound search" function represents a function for collating the present ambient sound, which is obtained by the sound obtaining unit 108, with the past ambient sounds stored in the handwriting storing unit 106; and retrieving, as the search results, past ambient sounds similar to the ambient sound obtained by the sound obtaining unit 108 and the pieces of handwriting corresponding to those past ambient sounds. While searching for information using the "ambient sound search" function, the controller 105C obtains, as the search results, past ambient sounds, from among the past ambient sounds stored in the handwriting storing unit 106C, that are similar to the ambient sound which is obtained by the sound obtaining unit 108 during the period of time in which a finger of the user is in contact with the control region CR and the pieces of handwriting corresponding to those ambient sounds.

The determination of similarity between ambient sounds is performed, for example, by performing frequency analysis and comparing the frequency characteristics that are extracted as the result. Alternatively, instead of comparing the frequency characteristics, the determination of similarity between ambient sounds can be performed by comparing some other feature quantity such as the sound volume. Still alternatively, if the ambient sound indicates the spoken voices of people, then the determination of similarity between ambient sounds can be performed using the degree of coincidence of words obtained as a result of performing voice recognition with respect to the ambient sounds.

The "music search" function represents a function that, in the case in which the present ambient sound obtained by the sound obtaining unit 108 indicates music, is implemented to search for music which is similar to the music obtained as the ambient sound. For example, from the frequency characteristic of the ambient sound obtained by the sound obtaining unit 108, the music having the same frequency characteristic can be identified. Then, a search can be performed using keywords such as names, composers, performers, and categories of musical compositions; and the music similar to the music obtained as the ambient sound can be retrieved as the search results from both inside and outside the device (i.e., from a music storing unit in the device and from websites on the Internet). While searching for information using the "music search" function, the controller 105C obtains, as the search results from both inside and outside the device, the music similar to the music which is obtained by the sound obtaining unit 108 during the period of time in which a finger of the user is in contact with the control region CR.

The information search function 110C that is implemented under the control of the controller 105C can be any one of the "handwriting search" function, the "ambient sound search" function, and the "music search" function described above, or can be a combination of two or more of those functions. In an identical manner to the second example, the information search function 110C to be implemented can be selected based on a user specification given prior to starting a search application. Alternatively, even after a search application is started; for example, the information search function 110C to be implemented can be changed depending on the number of times of brief contact with respect to the central region CR as described in the first example. Still alternatively, the information search function 110C to be implemented can be changed, for example, in response to the operation of a switch button that is separately disposed.

The search results obtained by the information search function 110C are displayed by the search result display unit 107 in the search result display area DA in an identical manner to the second example. Thus, if a plurality of pieces of information is obtained as the search results by implementing the information search function 110C; then, the search result display unit 107 displays the plurality of pieces of information in such a manner that the higher the priority of a set of information as the search result, the closer is the display position of that piece of information from the center point of the search result display area. Moreover, the search result display unit 107 displays the plurality of pieces of information obtained as the search results in such a manner that the higher the priority of a piece of information as the search result, the larger is the display size of that piece of information.

Moreover, for example, if the information search function 110C performs a search from a plurality of viewpoints; then, for each viewpoint, the search result display unit 107 arranges the information obtained as the search results along a plurality of viewpoint axes extending in different directions from the center point of the search result display area. A search performed from a plurality of viewpoints indicates a search performed by combining two or more functions of the "handwriting search" function, the "ambient sound function", and the "music function" described above or indicates a compound retrieval performed from a plurality of viewpoints having different valuation bases of the degree of similarity. In such a case too, regarding the viewpoint-by-viewpoint information arranged on each viewpoint axis; the higher the priority of a piece of information as the search result, the closer is the display position of that piece of information from the center point of the search result display area; and the higher the priority of a piece of information as the search result, the larger is the display size of that piece of information.

Figure 12:
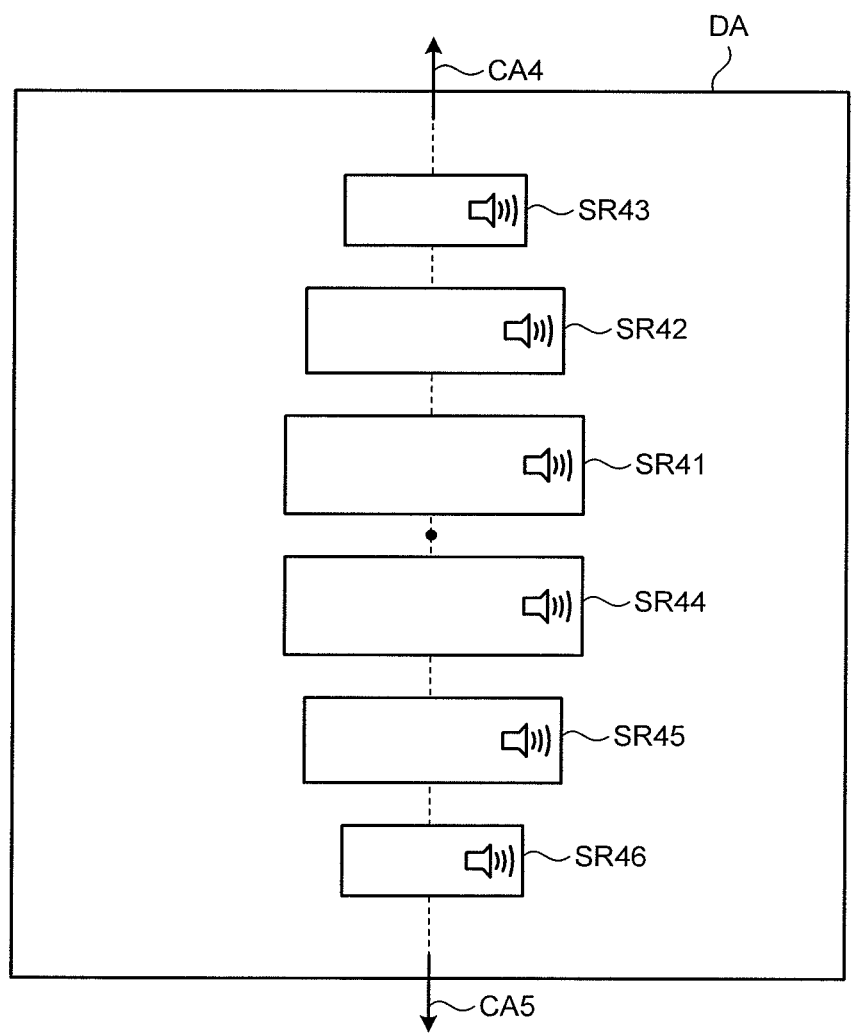
FIG. 12 is a diagram illustrating an example of the display screen that is displayed in the search result display area.

FIG. 12 is a diagram illustrating an example of the display screen that is displayed in the search result display area DA. In FIG. 12 is illustrated an example of a screen in which six search results SR41, SR42, SR43, SR44, SR45, and SR46 are displayed that are obtained as a result of a search performed by implementing a combination of the "handwriting search" function and the "ambient sound search" function. Of these search results, the search results SR41, SR42, and SR43 represent the search results obtained from the handwriting storing unit 106C as a result of implementing the "handwriting search" function. Herein, the search result SR41 has the highest degree of handwriting similarity, the search result SR42 has the second highest degree of handwriting similarity, and the search result SR43 has the third highest degree of handwriting similarity. These search results SR41, SR42, and SR43 represent information containing the past pieces of handwriting similar to the input piece of handwriting and the links to the storage locations in the handwriting storing unit 106 of the ambient sounds corresponding to those past pieces of handwriting. Thus, when the user performs a touch operation at the position at which a past piece of handwriting is displayed, the past ambient sound corresponding to that past piece of handwriting is retrieved from the handwriting storing unit 106C and is reproduced and output from a speaker.

The search results SR44, SR45, and SR46 represent the search results obtained from the handwriting storing unit 106C as a result of implementing the "ambient sound search" function. The search result SR44 has the highest degree of ambient sound similarity, the search result SR25 has the second highest degree of ambient sound similarity, and the search result SR26 has the third highest degree of ambient sound similarity. These search results SR44, SR45, and SR46 represent information containing the links to the storage locations in the handwriting storing unit 106 of the past ambient sounds similar to the present ambient sound and the past pieces of handwriting corresponding to those past ambient sounds. Moreover, the search results SR44, SR45, and SR46 can be manipulated in an identical manner to the search results SR41, SR42, and SR43.

As illustrated in FIG. 12, the search result display unit 107 arranges the search results SR41, SR42, and SR43, which are obtained as a result of implementing the "handwriting search" function, along a handwriting similarity axis CA4 that is a viewpoint axis extending in the upward direction from the center point of the search result display area DA. Moreover, the search result display unit 107 arranges the search results SR44, SR45, and SR46, which are obtained as a result of implementing the "ambient sound search" function, along an ambient sound similarity axis CA5 that is a viewpoint axis extending in the downward direction from the center point of the search result display area DA. Furthermore, on each viewpoint axis, the higher the priority of a search result, the closer is the display position of that search result from the center point of the search result display area DA and the larger is the display size of that search result when displayed by the search result display unit 107.

Figure 13:
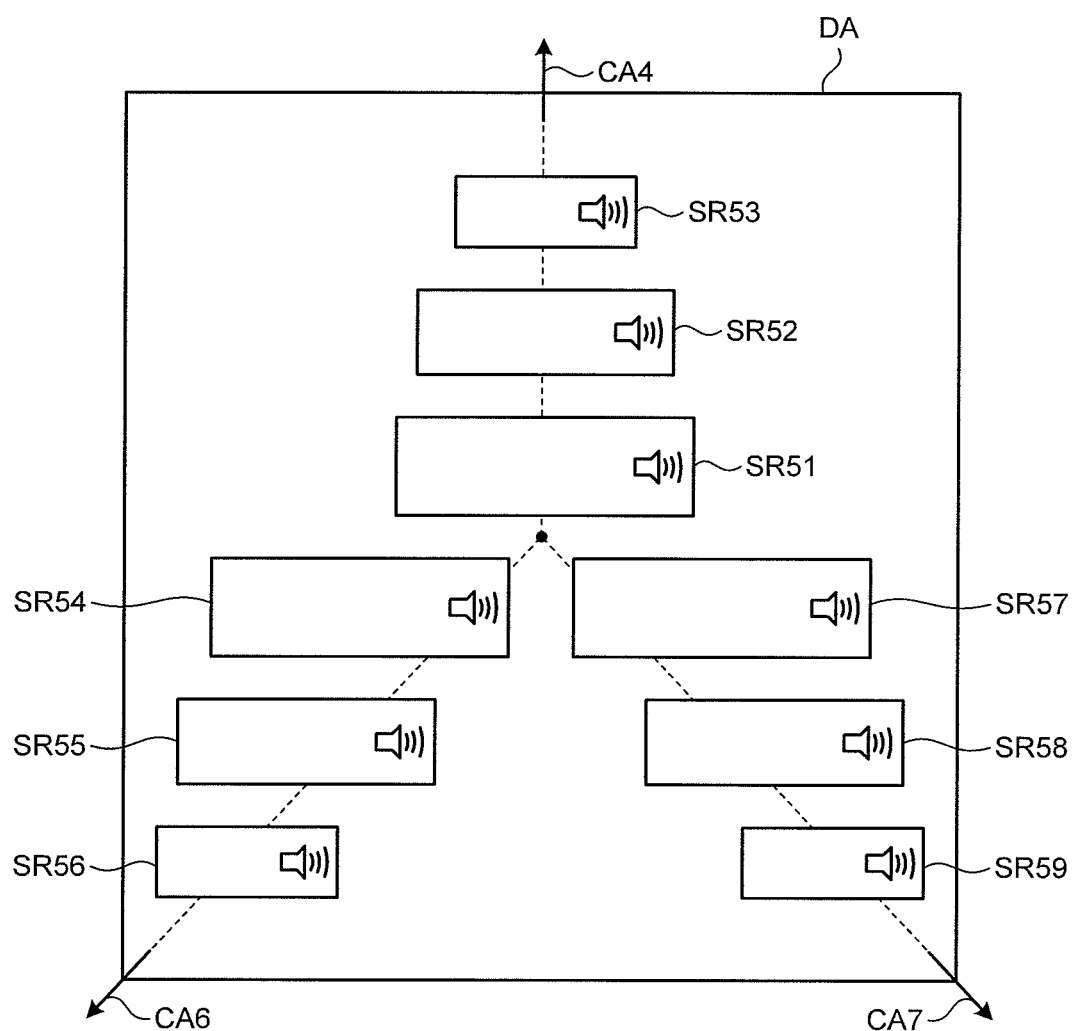
FIG. 13 is a diagram illustrating another example of the display screen that is displayed in the search result display area.

FIG. 13 is a diagram illustrating another example of the display screen that is displayed in the search result display area DA. In FIG. 13 is illustrated an example of a screen in which nine search results SR51, SR52, SR53, SR54, SR55, SR56, SR57, SR58, and SR59 are obtained as a result of a search performed by implementing a combination of the "handwriting search" function and the "music search" function and by performing a search from two viewpoints, namely, a singer name viewpoint and a category viewpoint. Of these search results, the search results SR51, SR52, and SR53 represent the search results obtained from the handwriting storing unit 106C as a result of implementing the "handwriting search" function. Herein, the search result SR51 has the highest degree of handwriting similarity, the search result SR52 has the second highest degree of handwriting similarity, and the search result SR53 has the third highest degree of handwriting similarity.

The search results SR54, SR55, and SR56 represent information obtained from, for example, websites outside the device as a result of implementing the "music search" function from the singer name viewpoint. The search result SR54 has the highest priority (the highest degree of singer name similarity; or, when the singer name matches, the highest degree of song title similarity), the search result SR55 has the second highest priority, and the search result SR56 has the third highest priority. The search results SR57, SR58, and SR59 represent information obtained as a result of implementing the "music search" function from the category viewpoint. The search result SR57 has the highest priority (the highest degree of category similarity), the search result SR58 has the second highest priority, and the search result SR59 has the third highest priority.

The search results SR54, SR55, SR56, SR57, SR58, and SR59 that are obtained as a result of implementing the "music search" function represent, for example, information containing metadata, such as music catalogs or singer names, and links to the storage locations of the music. Thus, when the user performs a touch operation at the position at which the desired music composition or the desired singer name is displayed, the corresponding music is retrieved from a music storing unit in the device or from websites outside the device and is reproduced and output from a speaker.

As illustrated in FIG. 13, the search result display unit 107 arranges the search results SR51, SR52, and SR53, which are obtained as a result of implementing the "handwriting search" function, along the handwriting similarity axis CA4 that is a viewpoint axis extending in the upward direction from the center point of the search result display area DA. Moreover, the search result display unit 107 arranges the search results SR54, SR55, and SR56, which are obtained as a result of implementing the "music search" function from the singer name viewpoint, along a singer name similarity axis CA6 that is a viewpoint axis extending in the lower left direction from the center point of the search result display area DA. Furthermore, the search result display unit 107 arranges the search results SR57, SR58, and SR59, which are obtained as a result of implementing the "music search" function from the category viewpoint, along a category similarity axis CA7 that is a viewpoint axis extending in the lower right direction from the center point of the search result display area DA. Moreover, on each viewpoint axis, the higher the priority of a search result, the closer is the display position of that search result from the center point of the search result display area DA and the larger is the display size of that search result when displayed by the search result display unit 107.

Meanwhile, the operations performed in the information processing device 100C according to the third example are identical to the operations performed in the information processing device 100B according to the second example. Hence, the explanation of those operations is not repeated.

As described above, in the information processing device 100C according to the third example, at a position separated by a predetermined distance from the holding position HP, the control region CR is set for the purpose of enabling issuing instructions to search for sounds using the input handwriting. With that, by performing a simple operation in which the control region CR is touched by only moving a finger while holding the information processing device 100C, the user becomes able to perform a search for sounds using the input handwriting and to obtain the desired search results.

Moreover, in the information processing device 100C according to the third example, based on the input piece of handwriting and the obtained ambient sound, it becomes possible to efficiently obtain a variety of information such as past pieces of handwriting and respective ambient sounds similar to the present handwriting, or past ambient sounds and respective pieces of handwriting that are similar to the present ambient sound, or music similar to the present ambient sound.

Meanwhile, the information processing device 100C according to the third example can be implemented also in combination with the second example. In that case, the information search function 110C of the controller 105C not only implements the "handwriting search" function, the "ambient sound search" function, and the "music search" function but also implements the "handwriting search" function, the "text search" function, and the "image search" function according to the second example. The controller 105B controls the implementation of the information search function 110C according to any one of the functions described above or according to a combination of two or more of those functions, and obtains the search results.

Fourth Example

A fourth example is an example of application to a note application in an identical manner to the first example. However, the fourth example is an example of application to a note application that is particularly equipped with a sound recording function. In a note application equipped with a sound recording function, the ambient sound obtained along with obtaining a piece of handwriting can be stored in a corresponding manner to the piece of handwriting. An information processing device according to the fourth example (hereinafter, referred to as an information processing device 100D) stores a piece of handwriting, which is input during the period of time in which a finger of the user is in contact with the control region CR, with the ambient sound obtained along with the input piece of handwriting.

Figure 14:
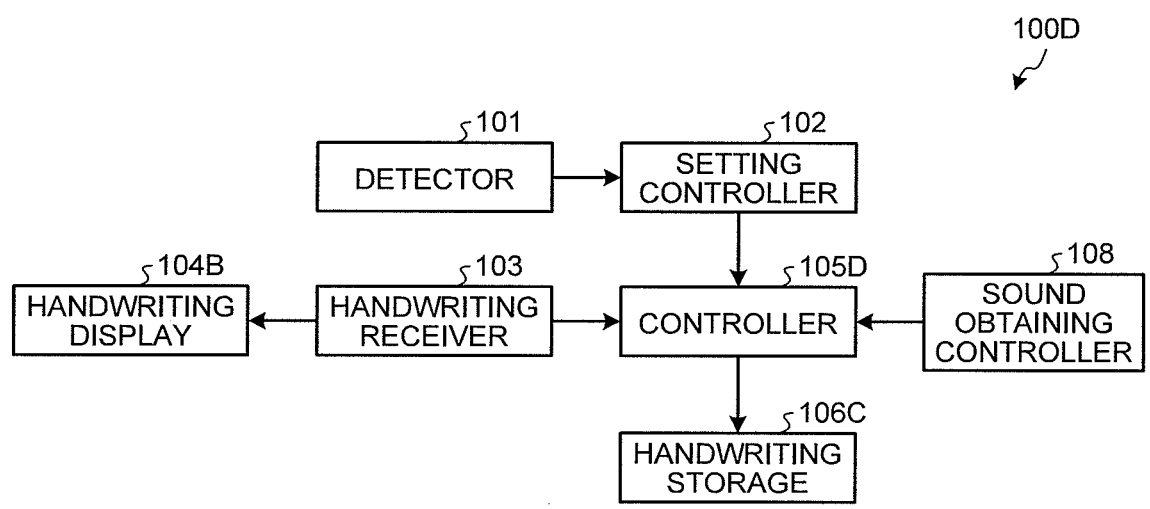
FIG. 14 is a block diagram illustrating an exemplary functional configuration of an information processing device according to a fourth example.

FIG. 14 is a block diagram illustrating an exemplary functional configuration of the information processing device 100D according to the fourth example. As illustrated in FIG. 14, the information processing device 100D according to the fourth example includes the detector 101, the setting controller 102, the handwriting receiver 103, the handwriting display 104B, the sound obtaining unit 108, a controller 105D, and the handwriting storing unit 106C. Herein, the detector 101, the setting controller 102, and the handwriting receiver 103 are common constituent elements with the first example. Moreover, the handwriting display 104B is a common constituent element with the second example. Furthermore, the sound obtaining unit 108 and the handwriting storing unit 106C are common constituent elements with the third example. Hence, the explanation of those constituent elements is not repeated.

Based on whether or not a finger of the user is touching the control region CR set by the setting controller 102, the controller 105D controls the operation of storing a piece of handwriting and the corresponding ambient sound in the handwriting storing unit 106C. That is, in the handwriting storing unit 106C, the controller 105D stores the input piece of handwriting, which is received by the handwriting receiver 103 during the period of time in which a finger of the user is in contact with the control region CR, in a corresponding manner to the ambient sound obtained by the sound obtaining unit 108.

More particularly, while receiving input at all times of handwriting data of the input piece of handwriting, which is received by the handwriting receiver 103, and data of the ambient sound obtained by the sound obtaining unit 108; the controller 105D determines whether or not a finger of the user is touching the control region CR set by the setting controller 102. Herein, regarding the method of determining whether or not a finger of the user is touching the control region CR, the same method as the method according to the first example is implemented. If it is determined that a finger of the user is touching the control region CR, then the controller 105D stores the piece of handwriting input during that period of time in the handwriting storing unit 106C in a corresponding manner with the ambient sound that is obtained from a point of time earlier by a certain period of time than the point of time of inputting the piece of handwriting to a point of time later than the point of time of completing the input of the piece of handwriting. Meanwhile, the interval of the ambient sound to be stored can also be selected from the following: the interval during which the user is inputting a piece of handwriting; or when it can be determined that the piece of handwriting has a continuous input sound, the interval during which the input sound of the piece of handwriting is continuous; or when the input of the piece of handwriting has a frequency characteristic, the interval during which the sound having a similar frequency characteristic is present. Meanwhile, of the ambient sound obtained by the sound obtaining unit 108, the ambient sound that is not stored in the handwriting storing unit 106C is destroyed.

Figure 15:
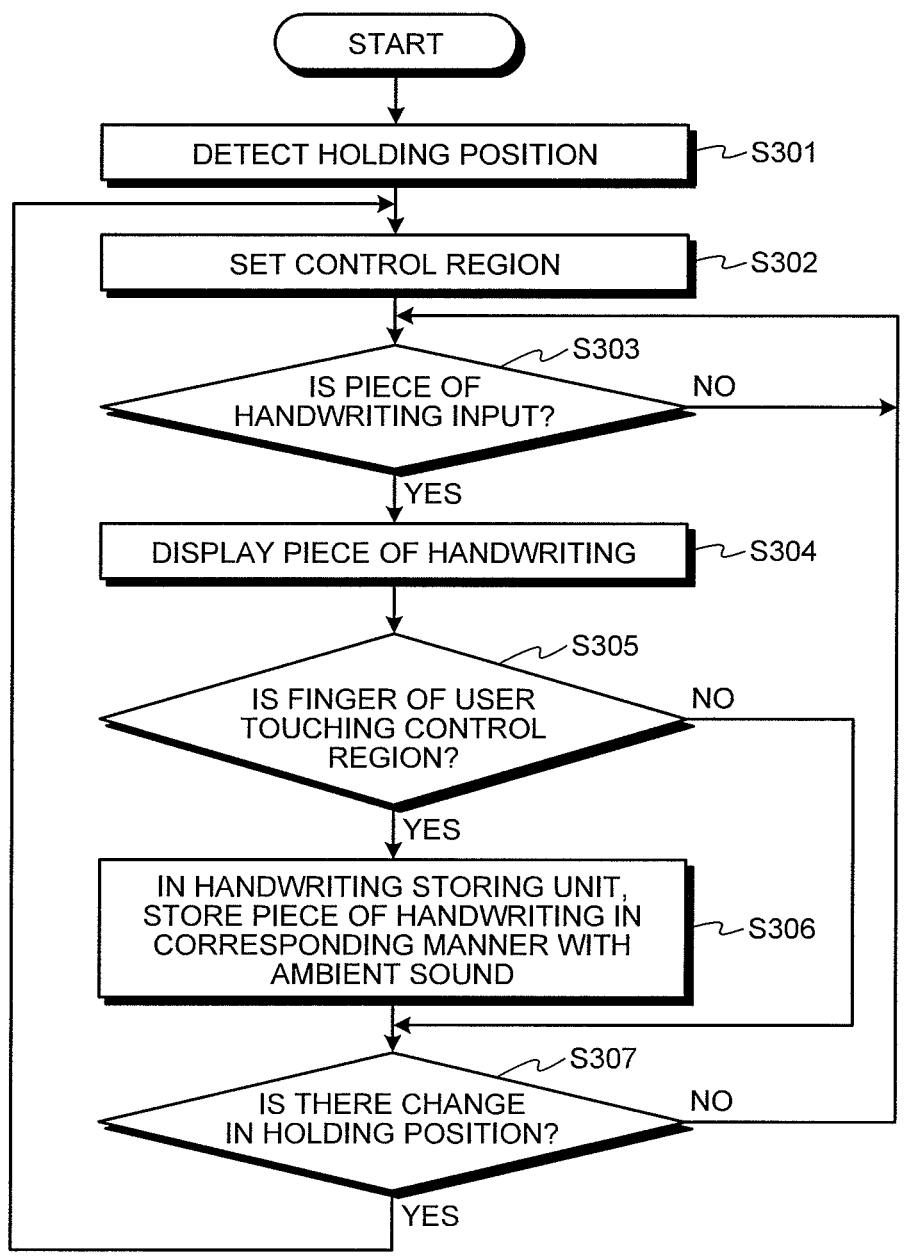
FIG. 15 is flowchart for explaining the operations performed in the information processing device according to the fourth example.

FIG. 15 is flowchart for explaining the operations performed in the information processing device 100D according to the fourth example. The sequence of operations illustrated in the flowchart in FIG. 15 starts with the start of execution of a note application equipped with a sound recording function and ends with the end of the note application with a sound recording function.

Once the execution of the note application equipped with a sound recording function is started; firstly, the detector 101 detects the holding position HP (Step S301). Then, the setting controller 102 sets the control portion CR at a position separated by a predetermined distance from the holding position HP, which is detected by the detector 101 (Step S302).

Subsequently, when the handwriting receiver 103 starts receiving input of a piece of handwriting and when the sound obtaining unit 108 starts obtaining the ambient sound, the handwriting display 104B determines whether or not the piece of handwriting has been input (Step S303). If the piece of handwriting is not yet input (No at Step S303), then the handwriting display 104B waits till the piece of handwriting is input. Once the piece of handwriting is input (Yes at Step S303), the handwriting display 104B displays the input piece of handwriting in the handwriting display area (Step S304) and the controller 105D determines whether or not a finger of the user is touching the control region CR that has been set by the setting controller 102 (Step S305).

If a finger of the user is touching the control region CR (Yes at Step S305), then the controller 105D stores the input piece of handwriting in the handwriting storing unit 106C in a corresponding manner to the ambient sound obtained by the sound obtaining unit 108 (Step S306). On the other hand, if no finger of the user is touching the control region CR (No at Step S305), then the operation at Step S306 is not performed.

Then, it is determined whether or not there is a change in the holding position HP (Step S307). If there is no change in the holding position (No at Step S307), then the system control returns to Step S303 and an input of the next piece of handwriting is awaited. On the other hand, if there is a change in the holding position HP (Yes at Step S307), then the system control returns to Step S302. Then, the setting controller 102 newly sets the control region CR at a position separated by a predetermined distance from the new holding position HP. The subsequent operations are then repeated.

As described above, in the information processing device 100D according to the fourth example, at a position separated by a predetermined distance from the holding position HP, the control region CR is set for the purpose of storing the input piece of handwriting along with the corresponding ambient sound. With that, without having to stop inputting the piece of handwriting, the user becomes able to store the piece of handwriting along with the corresponding ambient sound by performing a simple operation in which the control region CR is touched by only moving a finger while holding the information processing device 100D.

Modification Examples

Meanwhile, each example described above is an example of application to the information processing device 100 that includes a handwriting input interface. However, the embodiment is not limited to an information processing device including a handwriting input interface. Alternatively, the embodiment can be applied to various types of information processing devices that can be operated by a user while holding.

Figure 16A:
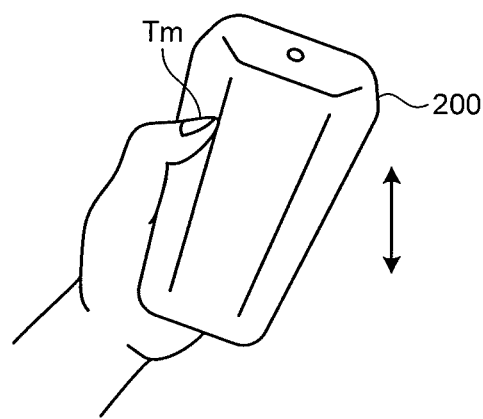
FIGS. 16A and 16B are diagrams illustrating an example of a usage condition of an information processing device according to a modification example.
Figure 16B:
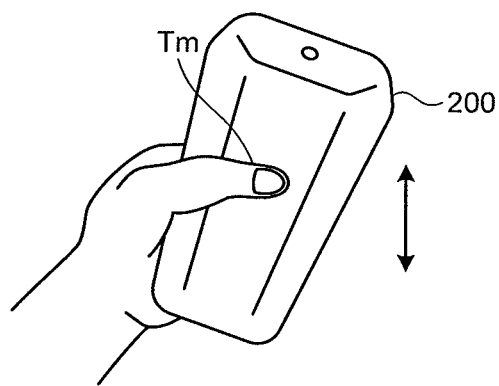

For example, the embodiment can also be applied to a gesture remote controller 200 that transmits control signals to a television according to the movements of a hand of the user. In this case, when the user holds the gesture remote controller 200 in, for example, a manner illustrated in FIG. 16A, the position of the thumb Tm of the user is detected as the holding position, and the control region is set at a position separated by a predetermined distance from the holding position. Then, if the user moves the gesture remote controller 200 up and down without moving the thumb Tm, control signals for increasing and reducing the volume of the television are transmitted to the television. On the other hand, as illustrated in FIG. 16B, if the user moves the thumb TM and touches the control region, the control signals are switched to control signals corresponding to the up-and-down motion of the gesture remote controller 200. Then, in response to the up-and-down motion of the gesture remote controller 200; for example, control signals for changing the reception channel are transmitted to the television.

Figure 17A:
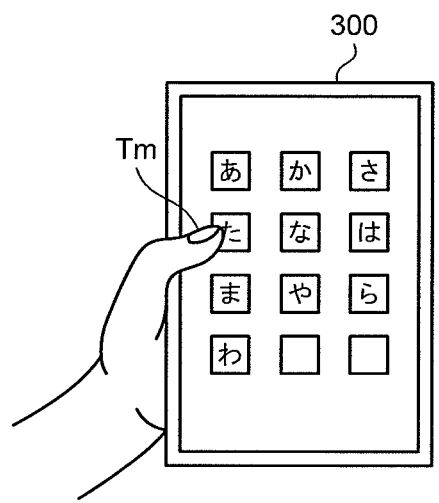
FIGS. 17A and 17B are diagrams illustrating an example of a usage condition of an information processing device according to another modification example.
Figure 17B:
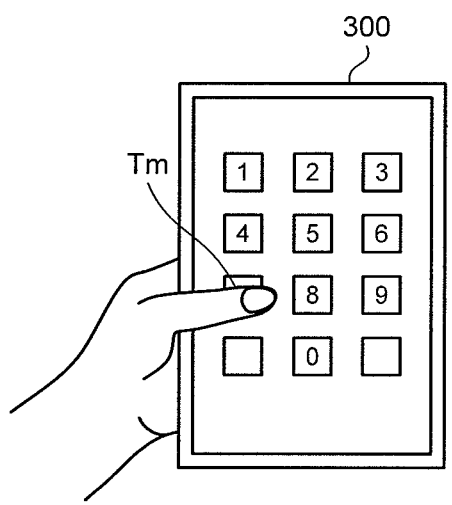

Alternatively, for example, as illustrated in FIG. 17, the embodiment can also be applied to an input device 300 that enables input of characters and numerals. In this case, for example, as illustrated in FIG. 17A, when the user holds the input device 300, the position of the thumb Tm of the user is detected as the holding position; and the control region is set at a position separated by a predetermined distance from the holding position. Then, during the period of time in which the user does not move the thumb Tm and does not touch the control region, it becomes possible to perform input in a Japanese language input mode. However, as illustrated in FIG. 17B, when the user moves the thumb TM and touches the control region, the input mode is switched from the Japanese language input mode to a numeral input mode. Thus, during the period of time in which the user is touching the control region, it becomes possible to perform input in the numeral input mode.

In this way, as described in detail in the specific examples and the modification examples, in the information processing device according to the embodiment, it becomes possible to control implementation of a predetermined function in response to a simple user operation.

Meanwhile, the embodiment can be implemented in an information processing device, which includes a computer system as the basic hardware, by instructing the processor of the computer system to execute computer programs. In that case, the computer programs can be installed in advance in the information processing device. Alternatively, the computer programs can be stored in a memory medium such as a compact disk read only memory (CD-ROM) or can be distributed via the Internet and then installed in the information processing device. Still alternatively, the computer programs can be executed in a server computer device, and the information processing device can receive the execution result via a network.

The computer programs executed in the information processing device according to the embodiment contain a module for each functional constituent element (the detector 101, the setting controller 102, the handwriting receiver 103, the handwriting display 104, and the controller 105A) of the information processing device. As far as the actual hardware is concerned, for example, a processor reads computer programs form the memory medium and runs them such that the computer programs are loaded in a main memory device. As a result, each constituent element is generated in the main memory device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a detector configured to detect a holding position of the information processing device;
a setting controller configured to set a control region at a position separated by a distance from the detected holding position;
a controller configured to, based on whether the control region is touched, control a function;
a handwriting data receiver configured to receive an input piece of handwriting data;
a sound obtaining controller configured to obtain an ambient sound; and
a handwriting data storage configured to store the input piece of handwriting data in a corresponding manner to an ambient sound which is obtained along with the input piece of the handwriting data, wherein
the function includes a search function to search for information, and
the controller is configured to search for information using a first piece of handwriting data that is input during a period of time in which contact with the control region is made,
among input pieces of handwriting data that have been stored in the handwriting data storage, the controller obtains, as a search result, a second piece of handwriting data and the ambient sound corresponding to the second piece of handwriting data, the second piece of handwriting data being similar to the first piece of handwriting data, and
among the ambient sounds that are stored in the handwriting data storage the controller further obtains, as a search result, a second ambient sound and a third piece of handwriting data corresponding to the second ambient sound, the second ambient sound being similar to the first ambient sound.

2. The device according to claim 1, wherein
the detector is configured to obtain, in a chronological order, contact regions where a contact has been made, and
when a condition in which a variation in center of gravity positions of the contact regions remains within a range for a period of time, the detector is configured to detect a reference position in the contact regions as the holding position.

3. The device according to claim 1, wherein
the holding position of the information processing device indicates a position of a finger of a user who is holding the information processing device.

4. The device according to claim 1, further comprising:
a handwriting data display configured to display the input piece of handwriting data; and
a handwriting data storage configured to store the input piece of handwriting data in a corresponding manner to background information which is displayed on the handwriting data display as background of the input piece of handwriting data, wherein
among input pieces of handwriting data that have been stored in the handwriting data storage, the controller obtains, as a search result, a second piece of handwriting data and background information corresponding to the second piece of handwriting data, the second piece of handwriting data being similar to the first piece of handwriting data.

5. The device according to claim 4, wherein, based on the background information corresponding to the first piece of handwriting data, the controller further searches for information and obtains a search result.

6. The device according to claim 5, wherein, based on a first ambient sound obtained during contact with the control region is made, the controller further searches for information and obtains a search result.

7. The device according to claim 1, further comprising a search result display to display pieces of information obtained as search results in such a manner that for a piece of information having a higher priority as a search result, a display position of the piece of information is closer to a center point of a display area.

8. The device according to claim 1, wherein
the controller searches for information from a plurality of viewpoints using the first piece of handwriting data, and
the search result display is configured to arrange, for each of the plurality of viewpoints, the pieces of information, which are obtained as search results, along a plurality of viewpoint axes extending in different directions from the center point of the display area as well as to arrange the pieces of information in such a manner that a piece of information having a higher priority as a search result, the display position of the piece of information is closer to the center point of the display area.

9. The device according to claim 1, wherein, the search result display displays the pieces of information obtained as search results in such a way that for a piece of information having a higher priority as a search result, a display size of the piece of information is larger.

10. The device according to claim 1, further comprising:
a handwriting data receiver configured to receive an input piece of handwriting data;
a sound obtaining controller configured to obtain an ambient sound; and
a handwriting data storage,
the function comprises storing the input piece of handwriting data in the handwriting data storage in a corresponding manner with the ambient sound, and
the controller is configured to store a first piece of handwriting data, which is input during a period of time in which contact with the control region is made, in the handwriting data storage in a corresponding manner to the ambient sound obtained along with the first piece of handwriting data.

11. The device according to claim 1, further comprising:
a handwriting data receiver configured to receive an input piece of handwriting data; and
a handwriting display,
the function comprises displaying the input piece of handwriting data on the handwriting display, and
the controller is configured to change display color or line type of a piece of handwriting data that is input during a period of time in which contact with the control region is made from display color or line type of a piece of handwriting data that is input during a period of time in which contact with the control region is not made, and displays the changed display color or changed line type on the handwriting data display.

12. A method implemented in an information processing device, the method comprising:
    detecting a holding position of the information processing device;
    setting a control region at a position separated by a distance from the detected holding position;
    controlling a function based on whether or not the control region is touched receiving an input piece of handwriting data;
    obtaining an ambient sound; and
    storing the input piece of handwriting data in a corresponding manner to an ambient sound which is obtained along with the input piece of the handwriting data, wherein
    the function includes a search function to search for information, and
    the controlling includes searching for information using a first piece of handwriting data that is input during a period of time in which contact with the control region is made,
    among input pieces of handwriting data that have been stored in the handwriting data storage, the controlling includes obtaining, as a search result, a second piece of handwriting data and the ambient sound corresponding to the second piece of handwriting data, the second piece of handwriting data being similar to the first piece of handwriting data, and
    among the ambient sounds that are stored in the handwriting data storage, the controlling further includes obtaining, as a search result, a second ambient sound and a third piece of handwriting data corresponding to the second ambient sound, the second ambient sound being similar to the first ambient sound.

13. A computer program product comprising a non-transitory computer-readable medium containing a computer program that causes a computer to perform:
    detecting a holding position of the information processing device;
    setting a control region at a position separated by a distance from the detected holding position;
    controlling a function based on whether or not the control region is touched;
    receiving an input piece of handwriting data;
    obtaining an ambient sound; and
    storing the input piece of handwriting data in a corresponding manner to an ambient sound which is obtained along the input piece of the handwriting data, wherein
    the function includes a search function to search for information, and
    the controlling includes searching for information using a first piece of handwriting data that is input during a period of time in which contact with the control region is made,
    among input pieces of handwriting data that have been stored in the handwriting data storage the controlling includes obtaining as a search result a second niece of handwriting data and the ambient sound corresponding to the second piece of handwriting data, the second piece of handwriting data being similar to the first piece of handwriting data, and
    among the ambient sounds that are stored in the handwriting data storage the controlling further includes obtaining, as a search result, a second ambient sound and a third piece of handwriting data corresponding to the second ambient sound, the second ambient sound being similar to the first ambient sound.

\* \* \* \* \*